United States Patent
Wang et al.

(10) Patent No.: US 11,573,991 B2
(45) Date of Patent: Feb. 7, 2023

(54) DEEP REINFORCEMENT LEARNING-BASED MULTI-STEP QUESTION ANSWERING SYSTEMS

(71) Applicant: Samsung Electronics Co., Ltd., Suwon-si (KR)

(72) Inventors: Yu Wang, Bellevue, WA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 573 days.

(21) Appl. No.: 16/695,641

(22) Filed: Nov. 26, 2019

(65) Prior Publication Data
US 2020/0175046 A1 Jun. 4, 2020

Related U.S. Application Data

(60) Provisional application No. 62/773,421, filed on Nov. 30, 2018.

(51) Int. Cl.
*G06F 16/33* (2019.01)
*G06F 16/338* (2019.01)
(Continued)

(52) U.S. Cl.
CPC .......... *G06F 16/334* (2019.01); *G06F 16/338* (2019.01); *G06F 16/358* (2019.01);
(Continued)

(58) Field of Classification Search
CPC .... G06F 16/334; G06F 16/358; G06F 16/338; G06N 3/0454; G06N 3/08
USPC ........................................................ 707/728
See application file for complete search history.

(56) References Cited

U.S. PATENT DOCUMENTS

2006/0288001 A1* 12/2006 Costa ................... G06F 16/951
707/999.005
2007/0203863 A1* 8/2007 Gupta .................. G06N 3/0454
706/20
(Continued)

OTHER PUBLICATIONS

Choi et al., "Coarse-to-Fine Question Answering for Long Documents", Jul. 2017, Association for Computational Linguistics, pp. 209-220 (Year: 2017).*
(Continued)

*Primary Examiner* — Hosain T Alam
*Assistant Examiner* — Robert F May

(57) ABSTRACT

A method includes receiving a user query and performing, using at least one processor, multiple rounds of an answer generation process. Each round of the answer generation process includes selecting one of multiple functions to be performed based on an input state. The input state for each round includes an embedding of the user query in a feature space. The input state for at least one round also includes an embedding of information to be used to identify an answer to the user query in the feature space. Each round of the answer generation process also includes performing the selected function. The multiple functions include (i) an answer generation function that produces the answer to the user query and (ii) at least one additional function that updates the input state for a current round for use during a subsequent round. In addition, the method includes providing the answer to the user.

28 Claims, 7 Drawing Sheets

(51) Int. Cl.
  G06N 3/08 (2006.01)
  G06K 9/62 (2022.01)
  G06N 3/04 (2006.01)
  G06F 16/35 (2019.01)

(52) U.S. Cl.
  CPC ......... *G06K 9/6256* (2013.01); *G06N 3/0454* (2013.01); *G06N 3/08* (2013.01)

(56) References Cited

U.S. PATENT DOCUMENTS

| | | | | |
|---|---|---|---|---|
| 2016/0240095 | A1* | 8/2016 | Baughman | G09B 7/00 |
| 2017/0124432 | A1* | 5/2017 | Chen | G06T 1/60 |
| 2017/0351663 | A1* | 12/2017 | Sordoni | G06F 40/30 |
| 2018/0052915 | A1* | 2/2018 | Cohn | G06N 20/00 |
| 2020/0167834 | A1* | 5/2020 | Matsuoka | G06Q 30/0278 |

OTHER PUBLICATIONS

Stroh et al. "Question Answering Using Deep Learning", 2016, The Stanford Natural Language Processing Group CS224d: Deep Learning for Natural Language Processing: Reports for 2016 (Year: 2016).*
Andreas et al., "Learning to Compose Neural Networks for Question Answering", Proceedings of NAACL-HLT 2016, Jun. 2016, pp. 1545-1554.
Chen et al., "Reading Wikipedia to Answer Open-Domain Questions", Proceedings of the 55th Annual Meeting of the Association for Computational Linguistics, vol. 1: Long Papers, Jul. 2017, pp. 1870-1879.
Chen et al., "A Thorough Examination of the CNN/Daily Mail Reading Comprehension Task", Proceedings of the 54th Annual Meeting of the Association for Computational Linguistics, vol. 1: Long Papers, Aug. 2016, pp. 2358-2367.
Choi et al., "Coarse-to-Fine Question Answering for Long Documents", Proceedings of the 55th Annual Meeting of the Association for Computational Linguistics, vol. 1: Long Papers, Jul. 2017, pp. 209-220.
Chung et al., "Empirical Evaluation of Gated Recurrent Neural Networks on Sequence Modeling", NIPS 2014 Workshop on Deep Learning, Dec. 2014, 9 pages.
Clark et al., "Deep Reinforcement Learning for Mention-Ranking Coreference Models", Proceedings of the 2016 Conference on Empirical Methods in Natural Language Processing, Nov. 2016, pp. 2256-2262.
Zhu et al., "Multi-class AdaBoost," Statistics and its Interface, vol. 2, No. 3, Jan. 2009, pp. 349-360.
Hermann et al., "Teaching Machines to Read and Comprehend", Proceedings of the 28th International Conference on Neural Information Processing Systems—vol. 1 (NIPS'15), Dec. 2015, 14 pages.
Hewlett et al., "WikiReading: A Novel Large-scale Language Understanding Task over Wikipedia", Proceedings of the 54th Annual Meeting of the Association for Computational Linguistics, vol. 1: Long Papers, Aug. 2016, pp. 1535-1545.
Hill et al., "The Goldilocks Principle: Reading Children's Books with Explicit Memory Representations", 6th International Conference on Learning Representations, ICLR 2016, May 2016, 13 pages.
Kadlec et al., "Text Understanding with the Attention Sum Reader Network", Proceedings of the 54th Annual Meeting of the Association for Computational Linguistics, vol. 1: Long Papers, Aug. 2016, pp. 908-918.
Konda et al., "Actor-Critic Algorithms", Proceedings of the 12th International Conference on Neural Information Processing Systems (NIPS'99), Nov. 1999, pp. 1008-1014.
Milier et al., "Key-Value Memory Networks for Directly Reading Documents", Proceedings of the 2016 Conference on Empirical Methods in Natural Language Processing, Nov. 2016, pp. 1400-1409.
Mnih et al., "Human-level control through deep reinforcement learning", Nature, vol. 518, Feb. 2015, pp. 529-533.
Narasimhan et al., "Language Understanding for Text-based Games using Deep Reinforcement Learning", Proceedings of the 2015 Conference on Empirical Methods in Natural Language Processing, Sep. 2015, pp. 1-11.
Narasimhan et al., "Improving Information Extraction by Acquiring External Evidence with Reinforcement Learning", Proceedings of the 2016 Conference on Empirical Methods in Natural Language Processing, Nov. 2016, pp. 2355-2365.
Narendra et al., "Improving the Speed of Response of Learning Algorithms Using Multiple Models", 17th Yale Workshop on Adaptive and Learning Systems, Oct. 2015, 6 pages.
Narendra et al.,"Stability, Robustness, and Performance Issues on Second Level Adaptation", American Control Conference (ACC), Jun. 2014, pp. 2377-2382.
Narendra et al., "Fast Reinforcement Learning Using Multiple Models", 2016 IEEE 55th Conference on Decision and Control (CDC), Dec. 2016, pp. 7183-7188.
Nguyen et al., "MS MARCO: A Human Generated MAchine Reading COmprehension Dataset", 30th Conference on Neural Information Processing Systems (NIPS 2016), Dec. 2016, 11 pages.
Onishi et al., "Who did What: A Large-Scale Person-Centered Cloze Dataset", Proceedings of the 2016 Conference on Empirical Methods in Natural Language Processing, Nov. 2016, pp. 2230-2235.
Pennington et al., "Global Vectors for Word Representation", Proceedings of the 2014 Conference on Empirical Methods in Natural Language Processing (EMNLP), Oct. 2014, pp. 1532-1543.
Peters et al., "Natural Actor-Critic", Neurocomputing, vol. 71, Issues 7-9, Mar. 2008, pp. 1180-1190.
Rajpurkar et al., "SQuAD: 100,000+ Questions for Machine Comprehension of Text", Proceedings of the 2016 Conference on Empirical Methods in Natural Language Processing, Nov. 2016, pp. 2383-2392.
Rätsch et al., "Soft Margins for AdaBoost", Machine Learning, vol. 42, No. 3, Mar. 2001, pp. 287-320.
Seo et al., "Bidirectional Attention Flow for Machine Comprehension", International Conference on Learning Representations (ICLR 2017), Apr. 2017, 13 pages.
Sutton et al., "Policy Gradient Methods for Reinforcement Learning With Function Approximation", Proceedings of the 12th International Conference on Neural Information Processing Systems (NIPS'99), Nov. 1999, pp. 1057-1063.
Trischler et al., "NewsQa: A Machine Comprehension Dataset", Proceedings of the 2nd Workshop on Representation Learning for NLP, Aug. 2017, pp. 191-200.
Vaswani et al., "Attention is all you Need", Proceedings of the 31st International Conference on Neural Information Processing Systems (NIPS'17), Dec. 2017, pp. 6000-6010.
Wang et al., "A Boosting-Based Deep Neural Networks Algorithm for Reinforcement Learning", 2018 Annual American Control Conference (ACC), Jun. 2018, 7 pages.
Wang et al., "A Deep Reinforcement Learning based Multimodal Coaching Model (DCM) for Slot Filling in Spoken Language Understanding (SLU)", Interspeech 2018, Sep. 2018, pp. 3444-3448.
Wang et al., "A Bi-model based RNN Semantic Frame Parsing Model for Intent Detection and Slot Filling", Proceedings of the 2018 Conference of the North American Chapter of the Association for Computational Linguistics: Human Language Technologies, vol. 2 (Short Papers), Jun. 2018, pp. 309-314.
Wang, "A New Concept using LSTM Neural Networks for Dynamic System Identification", 2017 American Control Conference (ACC), May 2015, pp. 5324-5329.
Weissenborn et al., "Making Neural QA as Simple as Possible but not Simpler", Proceedings of the 21st Conference on Computational Natural Language Learning (CoNLL 2017), Aug. 2017, pp. 271-280.
Xiong et al., "Dynamic Coattention Networks for Question Answering", International Conference on Learning Representations (ICLR 2017), Apr. 2017, 14 pages.
Yang et al., "Hierarchical Attention Networks for Document Classification", Proceedings of the 2016 Conference of the North

(56) References Cited

OTHER PUBLICATIONS

American Chapter of the Association for Computational Linguistics: Human Language Technologies, Jun. 2016, pp. 1480-1489.
Yu et al., "Deep Learning for Answer Sentence Selection", NIPS Deep Learning and Representation Learning Workshop, Dec. 2014, 9 pages.
Yu et al., "QaNet: Combining Local Convolution with Global Self-Attention for Reading Comprehension", 6th International Conference on Learning Representations (ICLR 2018), Apr. 2018, 16 pages.
Zeiler, "ADADELTA: An Adaptive Learning Rate Method", Computer Science, 2012, 6 pages.
Wang et al., "A Deep Reinforcement Learning Based Multi-Step Coarse to Fine Question Answering (MSCQA) System", The Thirty-Third AAAI Conference on Artificial Intelligence (AAAI-19), Jan. 2019, pp. 7224-7232.
Yu et al., "Fast and Accurate Reading Comprehension by Combining Self-Attention and Convolution", 6th International Conference on Learning Representations (ICLR 2018), Apr. 2018, 15 pages.
Wikipedia, "Question answering", https://en.wikipedia.org/wiki/Question_answering, Nov. 29, 2018, 6 pages.
Wikipedia, "Amazon Alexa", https://en.wikipedia.org/wiki/Amazon_Alexa, Nov. 24, 2018, 22 pages.
Wikipedia, "Google Assistant", https://en.wikipedia.org/wiki/Google_Assistant, Nov. 16, 2018, 12 pages.
Wikipedia, "Siri", https://en.wikipedia.org/wiki/Siri, Nov. 20, 2018, 13 pages.
Angara, "Towards a Deeper Understanding of Current Conversational Frameworks through the Design and Development of a Cognitive Agent," Gandhi Institute of Technology and Management, 2012, 97 pages.

\* cited by examiner

DEEP REINFORCEMENT LEARNING-BASED MULTI-STEP QUESTION ANSWERING SYSTEMS

CROSS-REFERENCE TO RELATED APPLICATION AND CLAIM OF PRIORITY

This application claims priority under 35 U.S.C. § 119(e) to U.S. Provisional Patent Application No. 62/773,421 filed on Nov. 30, 2018, which is hereby incorporated by reference in its entirety.

TECHNICAL FIELD

This disclosure relates generally to machine learning systems. More specifically, this disclosure relates to deep reinforcement learning (DRL)-based multi-step question answering systems.

BACKGROUND

Machine comprehension-based question answering (QA) systems have drawn lots of interest in recent years. For example, question answering functionality has become an important feature for digital personal assistants on mobile electronic devices and other devices. Question answering systems are generally designed to receive questions from users, identify answers to those questions, and provide the identified answers to the users. Question answering systems often involve the use of various technologies, such as natural language understanding and information retrieval.

Currently, many state-of-the-art models for question answering systems are based on recurrent neural networks, which can process sequential inputs. A (co-)attention structure may also be used to deal with long-term interactions between the questions and documents in which the answers are located. However, one disadvantage of these types of models is that their training and inference speeds are relatively slow due to their recurrent nature. Another disadvantage of these types of models is that they are not particularly good at dealing with very long documents, which typically force the models to use truncated documents as their inputs.

SUMMARY

This disclosure provides deep reinforcement learning (DRL)-based multi-step question answering systems.

In a first embodiment, a method includes receiving a user query at a multi-step question answering system from a user. The method also includes performing, using at least one processor of the multi-step question answering system, multiple rounds of an answer generation process. Each round of the answer generation process includes selecting one of multiple functions to be performed based on an input state. The input state for each round includes an embedding of the user query in a feature space, and the input state for at least one round also includes an embedding of information to be used to identify an answer to the user query in the feature space. Each round of the answer generation process also includes performing the selected function. The multiple functions include (i) an answer generation function that produces the answer to the user query and (ii) at least one additional function that updates the input state for a current round of the answer generation process for use during a subsequent round of the answer generation process. In addition, the method includes providing the answer to the user.

In a second embodiment, an apparatus includes at least one memory and at least one processor operatively coupled to the at least one memory. The at least one processor is configured to receive a user query from a user and perform multiple rounds of an answer generation process. To perform each round of the answer generation process, the at least one processor is configured to select one of multiple functions to be performed based on an input state. The input state for each round includes an embedding of the user query in a feature space, and the input state for at least one round also includes an embedding of information to be used to identify an answer to the user query in the feature space. To perform each round of the answer generation process, the at least one processor is also configured to perform the selected function. The multiple functions include (i) an answer generation function configured to produce the answer to the user query and (ii) at least one additional function configured to update the input state for a current round of the answer generation process for use during a subsequent round of the answer generation process. The at least one processor is further configured to provide the answer to the user.

In a third embodiment, a non-transitory machine-readable medium contains instructions that when executed cause at least one processor to receive a user query from a user and perform multiple rounds of an answer generation process. Each round of the answer generation process includes selecting one of multiple functions to be performed based on an input state. The input state for each round includes an embedding of the user query in a feature space, and the input state for at least one round also includes an embedding of information to be used to identify an answer to the user query in the feature space. Each round of the answer generation process also includes performing the selected function. The multiple functions include (i) an answer generation function configured to produce the answer to the user query and (ii) at least one additional function configured to update the input state for a current round of the answer generation process for use during a subsequent round of the answer generation process. The medium also contains instructions that when executed cause the at least one processor to provide the answer to the user.

In a fourth embodiment, a method includes training an action selection function of a multi-step question answering system to select one of multiple actions to be performed by the question answering system in each of multiple rounds of an answer generation process used to identify an answer to a user query based on an input state. The input state for each round includes an embedding of the user query in a feature space, and the input state for at least one round also includes an embedding of information to be used to identify an answer to the user query in the feature space. The multiple functions include (i) an answer generation function that produces the answer to the user query and (ii) at least one additional function that updates the input state for a current round of the answer generation process for use during a subsequent round of the answer generation process.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
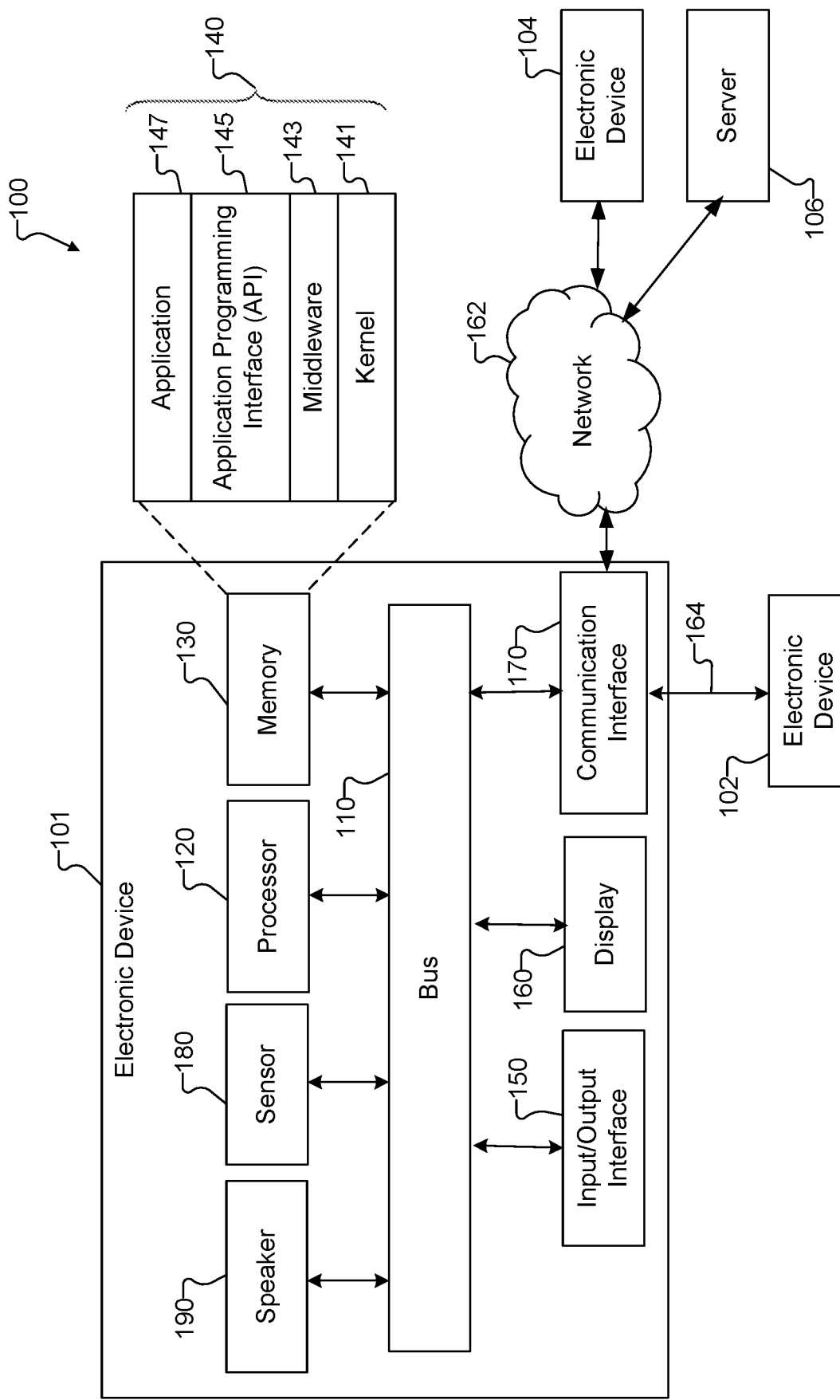
FIG. 1 illustrates an example network configuration including an electronic device in accordance with this disclosure.

FIGS. 1 through 10, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, machine comprehension-based question answering (QA) systems have drawn lots of interest in recent years and have become an important feature for digital personal assistants on mobile electronic devices and other devices. Many state-of-the-art models for question answering systems are currently based on recurrent neural networks (RNNs) with (co-)attention structures. A recurrent neural network processes sequential inputs, and a (co-)attention structure deals with long-term interactions between questions and documents in which answers are located. However, these models' training and inference speeds are relatively slow, and these models are not particularly good at dealing with very long documents and typically use truncated documents as their inputs instead.

One approach for overcoming at least some of these types of issues involves the use of a coarse-to-fine question answering model in which sentences in a long document related to a question are selected and then an answer to the question is identified using the selected sentences. This approach helps to reduce computational workload and provides decent performance with long documents. However, this approach does not perform as well as baseline models with datasets that include both short and long documents. This is because conventional RNN-based models can obtain correct results using shorter documents more accurately than the coarse-to-fine model. Also, in many cases, wrong answers to questions are actually from the same sentences that contain the correct answers, but the coarse-to-fine model operates at the sentence level and may therefore extract wrong answers and ignore correct answers in the same sentences. In addition, contextual information in documents is often useful and may be necessary in order to identify correct answers to questions, but only selecting and using particular sentences can ignore important contextual information that might be used in making correct judgments for answering questions.

Some state-of-the-art question answering systems may also support open-domain question answering, which means a system can (at least attempt to) provide an answer for any user's question in any given field. Many of these types of systems can be built by leveraging search results from web-based Internet searches. However, these types of systems use one-shot searching, meaning a single search step is performed and an answer is identified based on the search results from that single search step. As a particular example, if a user asks "What was the most visited landmark in San Francisco in 2018?", a question answering system may provide a link to a website related to tourism in San Francisco. Unfortunately, these types of systems are not user-friendly since users still need to click on links and review information themselves to find answers to their questions, which can be time consuming. Also, a link to one specific website may not provide the best answer that is possible for the user's question, and the user is not given an opportunity to select from other possible links (since each answer is generated in a single step).

In addition, one common challenge for many question answering systems is that users do not really know how the systems are generating answers to their questions. The entire answer generation process is more like a "black box" from a user's perspective and is not transparent to the user. If the answer given by a question answering system is wrong, the user does not know why the answer is wrong and cannot give feedback on how to improve the answer generation process. In some cases, a user is simply able to provide an indication whether or not an answer is correct or helpful.

This disclosure provides multi-step question answering (MSQA) systems that overcome these types of issues. As described in more detail below, some embodiments of the multi-step question answering systems use a deep reinforcement learning (DRL) model to achieve multi-step question answering, and an "actor-critic" based reinforcement learning model may be used in particular embodiments. The multi-step question answering system's model may be guided to learn the best action to perform at each round or step of an answer generation process. In each round, the answer generation process can select one of multiple actions to perform, where the actions include one or more actions that involve feeding information from one round of the answer generation process to the next round of the answer generation process (which may possibly be based on user feedback or other user input). At each round of the answer generation process, the multi-step question answering system performs one of the actions, eventually reaching a state in which the action involves generating an answer to the user's question and providing the answer to the user.

Depending on the implementation, the multi-step question answering systems disclosed here can provide various advantages. For example, in some embodiments, the multi-step question answering systems can have the ability to decide whether to generate a fine result or a coarse result based on context. Also, in some embodiments, the multi-step question answering systems can handle both short and long documents and can identify correct answers in either type of document, and this can be done quickly and in a robustness manner. Moreover, in some embodiments, the multi-step question answering systems are able to show users their searching scope (such as whether from specific websites or specific databases) at different search steps and can give the users a chance to correct the searching scope at each step. The users are therefore able to see how searches are being conducted and provide feedback, and the systems can learn corrections in a reinforcing manner and thereby improve their performance over time. Further, in some embodiments, the multi-step question answering systems learn to reject false-positive answers that are identified, which provides a self-correcting capability that makes the systems "smarter" and gives the systems the ability to learn and further improve their performance over time. In addition, in some embodiments, the multi-step question answering systems can achieve improved accuracy in their generated answers, which in some cases can be accomplished with reduced training times. Additional details regarding example embodiments of multi-step question answering systems are provided below.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, a sensor 180, or a speaker 190. In some embodiments, the electronic device 101 may exclude at least one of these components or may add at least one other component. The bus 110 includes a circuit for connecting the components 120-190 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, the processor 120 executes or otherwise provides a DRL-based multi-step question answering system. In other embodiments of this disclosure, the processor 120 interacts with an external device or system that executes or otherwise provides a DRL-based multi-step question answering system. In either case, the processor 120 can support interactions with a user, such as by receiving questions from the user and providing identified answers to the user.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for providing or interacting with a DRL-based multi-step question answering system, which can be used to generate answers to user questions. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more microphones, which may be used to capture utterances (such as questions) from one or more users. The sensor(s) 180 can also include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In addition, the electronic device 101 may include one or more speakers 190 that can convert electrical signals into audible sounds. For example, one or more speakers 190 may be used to audibly present identified answers for user questions to at least one user. Of course, answers for user questions may be presented in any other or additional manner, such as on the display 160.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-190 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 executes or otherwise provides a DRL-based multi-step question answering system, which can process questions (such as those from at least one electronic device 101, 102, 104) and provide answers to those questions (such as to the at least one electronic device 101, 102, 104) for presentation to one or more users.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
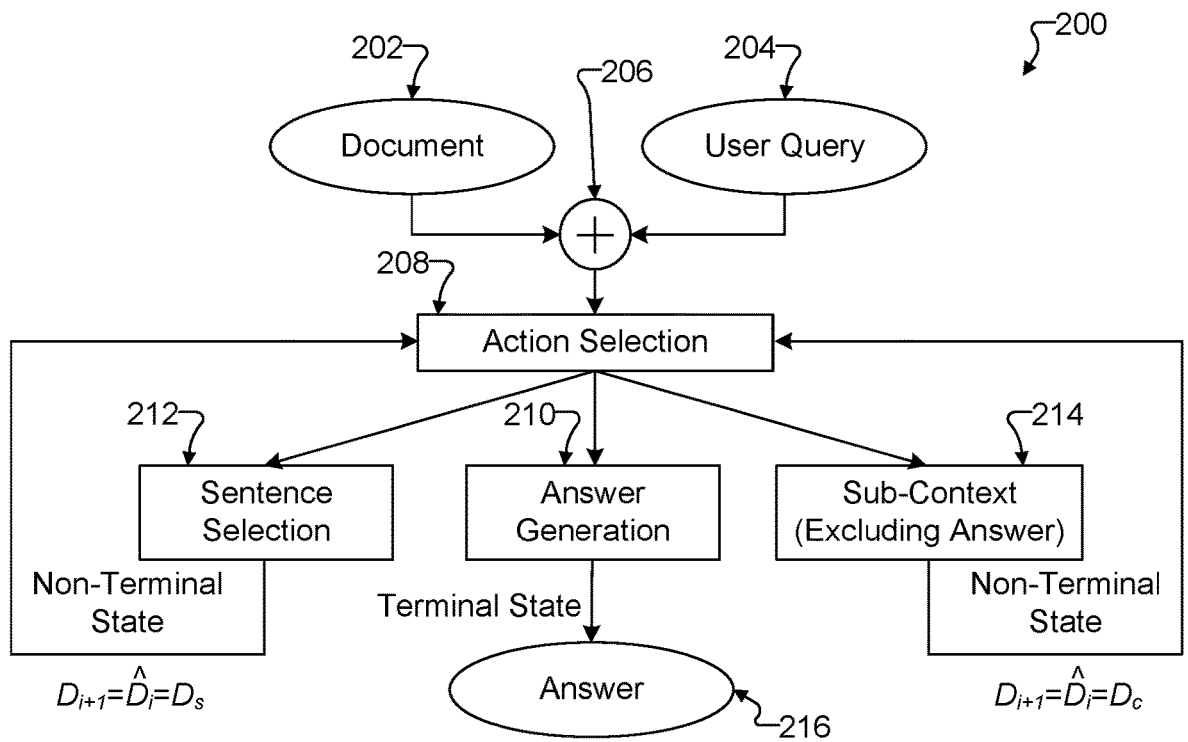
FIG. 2 illustrates a first example deep reinforcement learning (DRL)-based multi-step question answering system in accordance with this disclosure.

FIG. 2 illustrates a first example DRL-based multi-step question answering system 200 in accordance with this disclosure. For ease of explanation, the question answering system 200 of FIG. 2 may be described as being executed or otherwise provided by the server 106 in the network configuration 100 of FIG. 1 to answer user questions received from one or more electronic devices 101, 102, 104. However, the question answering system 200 of FIG. 2 may be executed or otherwise provided by any suitable device(s), including by the electronic devices 101, 102, 104 themselves, and in any suitable system(s).

As shown in FIG. 2, the question answering system 200 receives two inputs, namely a document 202 (which may be denoted D) and a user query 204 (which may be denoted Q). The document 202 represents information from any suitable source(s) that may be processed and used by the question answering system 200 to generate an answer to the user query 204. For example, the document 202 may represent information from a website identified during a web-based Internet search or information from a domain-specific database that is accessible by the question answering system 200. A domain-specific database may store information in any suitable manner, such as in the form of at least one knowledge graph containing (entity, relation) text tuples, which can be text-based. The user query 204 represents a question from a user, which may be obtained in any suitable manner (such as via text-based or voice-based input to an electronic device 101, 102, 104).

The document 202 and the user query 204 are received by an encoding function 206, which generally operates to produce encoded embeddings of the document 202 and the user query 204 in a feature space used by the question answering system 200. The feature space typically represents a latent space in which a machine learning algorithm (such as a convolutional neural network) has been trained, and the encoded embeddings of the document 202 and the user query 204 represent the contents of the document 202 and the user query 204 in the feature space. Converting the document 202 and the user query 204 into encoded embeddings facilitates further processing of the document 202 and the user query 204 using a suitable machine learning algorithm during one or more rounds of an answer generation process.

Figure 4:
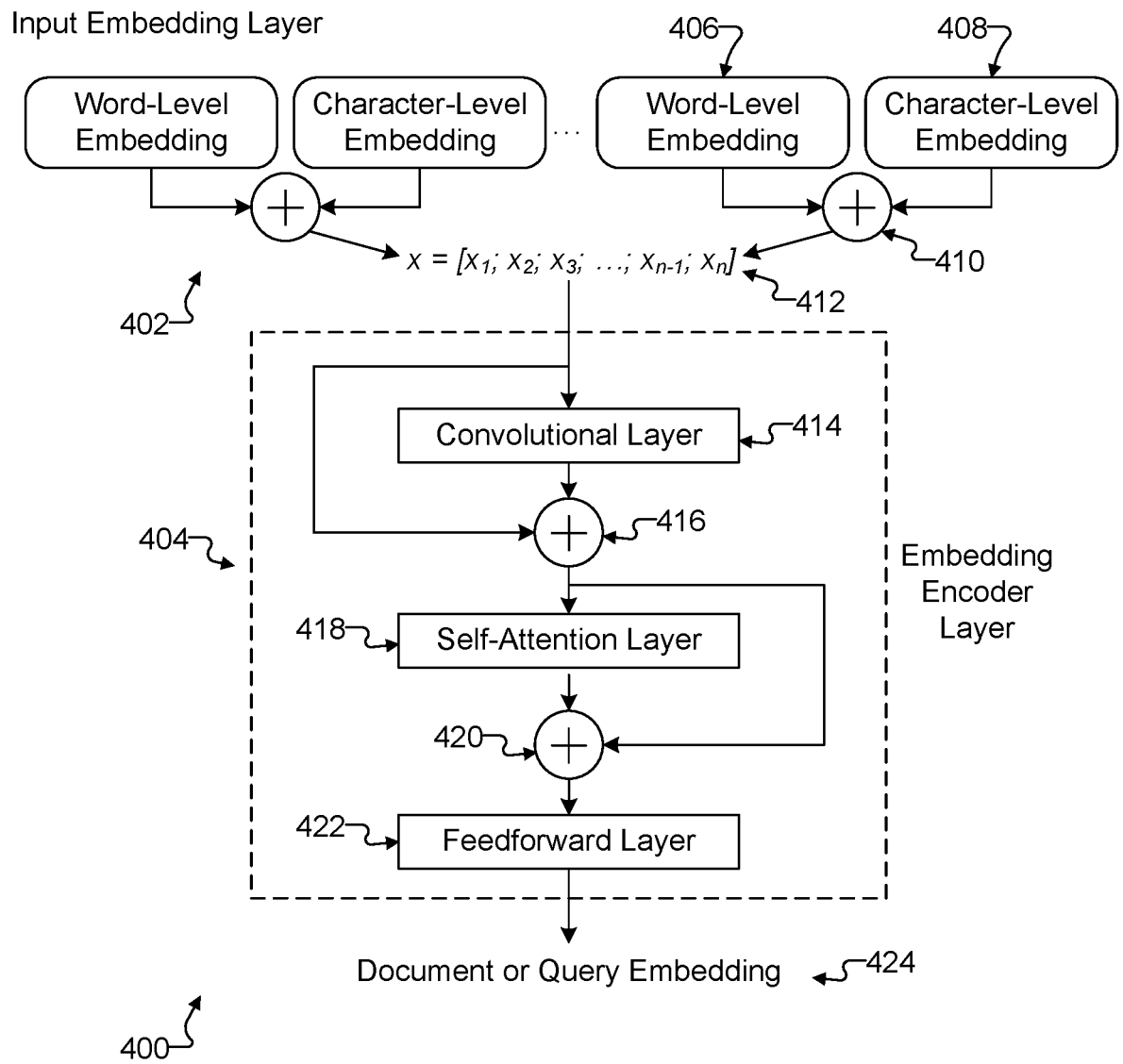
FIG. 4 illustrates an example encoding layer for a DRL-based multi-step question answering system in accordance with this disclosure.

As described below, the encoded embeddings of the document D that are used in each round of the answer generation process can vary, so the notation $D_i$ is used below to identify the document context used during round i of the answer generation process. Also, as described below, encoded embeddings for the document 202 and the user query 204 can be concatenated or otherwise combined for further processing. The encoding function 206 may use any suitable technique to identify embeddings of documents 202 and user queries 204 in a feature space and to encode the embeddings. One example implementation of the encoding function 206 is shown in FIG. 4, which is described below.

The outputs of the encoding function 206 are provided to an action selection function 208, which uses the outputs of the encoding function 206 to select one of multiple functions 210, 212, 214 to perform in each round of the answer generation process. Since the question answering system 200 supports a multi-step answering process, the action selection function 208 can select one of multiple functions 210, 212, 214 to perform in each step or round of the answer generation process. This can be repeated any number of times, such as until an answer 216 (which may be denoted $A_i$) to the user query 204 is identified or a specified number of rounds have occurred.

Figure 5:
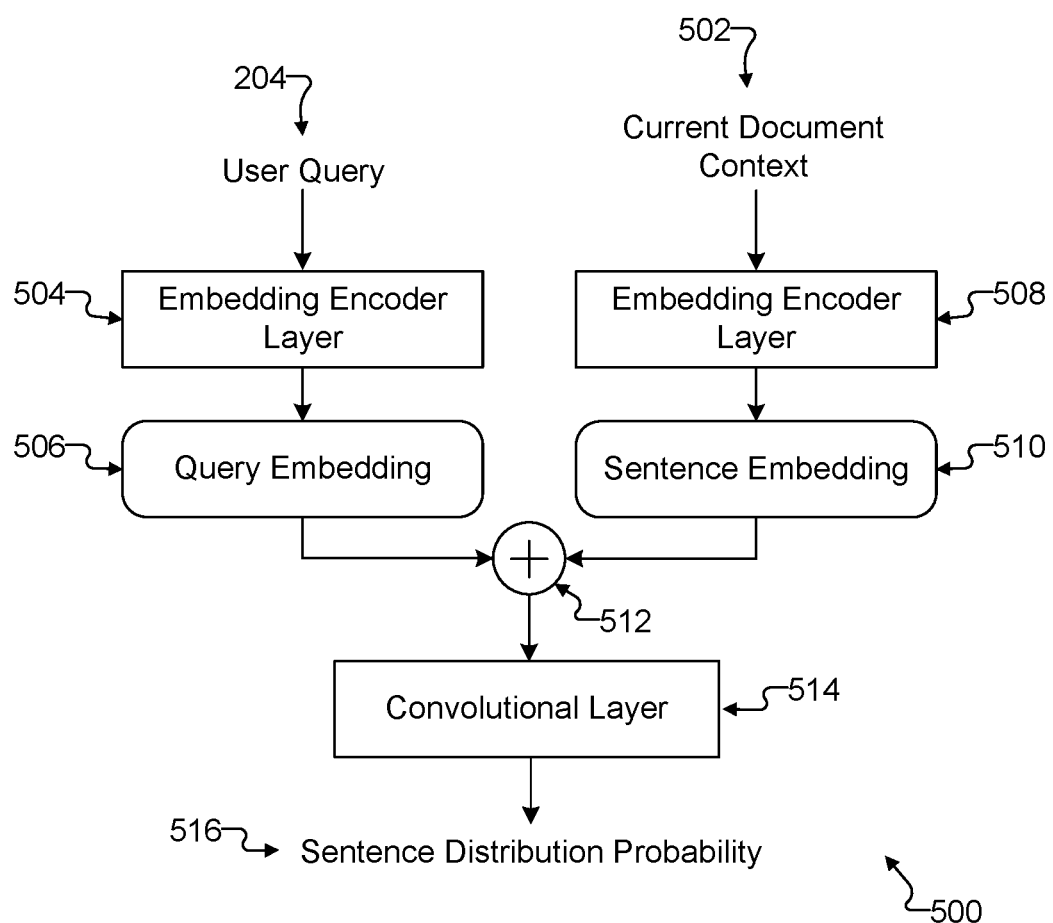
FIG. 5 illustrates an example sentence selection layer for a DRL-based multi-step question answering system in accordance with this disclosure.
Figure 6:
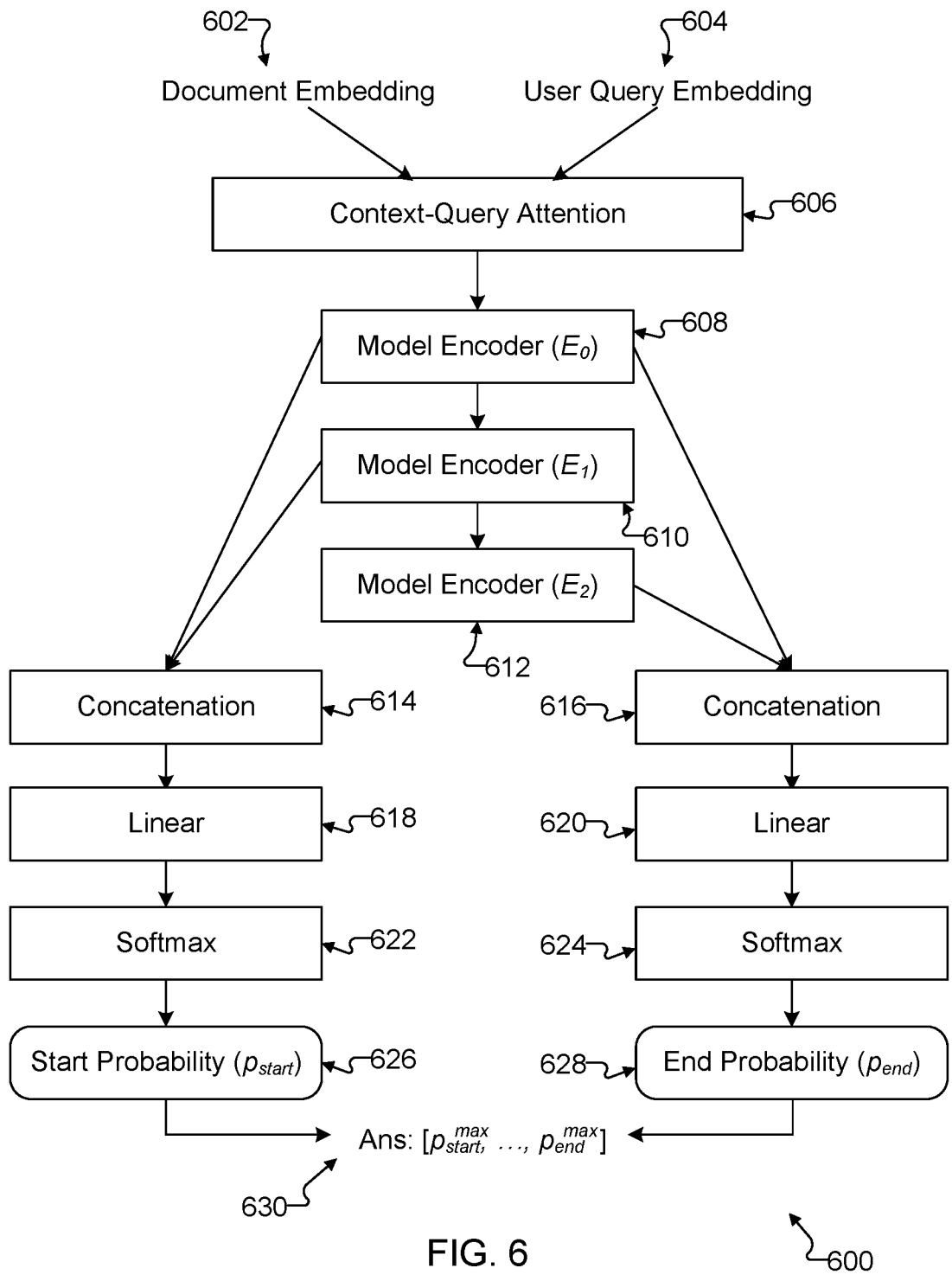
FIG. 6 illustrates an example answer generation layer for a DRL-based multi-step question answering system in accordance with this disclosure.

In this example, the functions 210, 212, 214 include an answer generation function 210, which generates the answer 216 to the user query 204 based on the current context $D_i$ of the document 202. The functions 210, 212, 214 also include a sentence selection function 212, which selects one or more sentences (which may be denoted $D_s$) from the current context $D_i$ of the document 202 that are relevant to the user query 204 and provides the one or more selected sentences $D_s$ as a new document context (which may be denoted $D_{i+1}$ or $\hat{D}_i$) for use during the next round of the answer generation process. This supports a coarse-to-fine approach in which part of a document 202 can be identified in one round and that part of the document 202 can be used in a subsequent round to identify the answer 216. One example implementation of the sentence selection function 212 is shown in FIG. 5, and one example implementation of the answer generation function 210 is shown in FIG. 6.

The functions 210, 212, 214 further include a sub-context selection function 214, which is used to select a sub-context (which may be denoted $D_c$) from the current context $D_i$ of the document 202 in order to reject a false-positive or incorrect answer $A_i$ that has been identified. The sub-context a of the document 202 can represent the current context $D_i$ of the document 202 except for the portion(s) of the document 202 giving rise to the incorrect answer $A_i$. This helps to avoid confusion and improve the chances of finding a correct answer $A_i$ in a subsequent round. The sub-context selection function 214 feeds the identified sub-context $D_c$ as a new document context (which again may be denoted $D_{i+1}$ or $\hat{D}_i$) for use during the next round of the answer generation process. This supports the rejection of false-positive or incorrect answers that have been identified by the system 200.

The functions 210, 212, 214 here are associated with different states of the question answering system 200. For example, the answer generation function 210 is associated with a terminal state of the question answering system 200 since, in this state, a final answer 216 to the user query 204 is generated and output to a user, which concludes the answer generation process used by the question answering system 200. The sentence selection function 212 is associated with a first non-terminal state of the question answering system 200 since, in that state, the question answering system 200 has identified an updated document context $D_{i+1}$ to be used in the next round of the answer generation process. Similarly, the sub-context selection function 214 is associated with a second non-terminal state of the question answering system 200 since, in this state, the question answering system 200 has again identified an updated document context $D_{i+1}$ to be used in the next round of the answer generation process.

Each round through the question answering process used by the question answering system 200 involves the action selection function 208 determining which function 210, 212, or 214 to perform in the current round, at which point the determined function is performed and one of the terminal and non-terminal states is reached. If a non-terminal state is reached, a subsequent round through the question answering process can be performed, thereby allowing the system 200 to continue searching for a correct answer 216 to the user query 204. This allows the system 200 to decide whether to generate a fine result or a coarse result based on the current context, which supports the use of both short and long documents 202 by the system 200. The system 200 can also learn how to reject false-positive answers using this approach, and the system 200 can achieve significantly better accuracy and speed compared to conventional question answering systems.

The action selection function 208 may use any suitable criteria to determine which of the functions 210, 212, 214 to perform in each round of the answer generation process. In some embodiments, in order to model the process of selecting an action, the action selection function 208 uses a DRL-based algorithm to learn the model automatically. For example, a DRL-based model may be formulated as a Markov decision process (MDP) based on four parameters: a state $s_t$, an action $a_t$, a reward $r_t$, and a policy $\pi$. Under this approach, for a given state $s_t$ during a stochastic process, the system 200 seeks the best action $a_t$ to perform in order to maximize an expected reward $r_t$ that is obtained by following some policy $\pi$. One goal of the DRL-based model is to seek the best policy $\pi^*$ (and hence the best corresponding action $a^*$) to be performed in each round of the answer generation process. There are various types of reinforcement learning algorithms, such as value-based, policy gradient, and actor-critic algorithms. In some implementations, an actor-critic-based DRL model can be used by the action selection function 208 in order to obtain a relatively stable training result for a large state space. However, other types of reinforcement learning algorithms may be used with the action selection function 208. Various examples of states $s_t$, actions $a_t$, rewards $r_t$, and other details of the question answering system 200 are provided below.

Each function 208, 210, 212, 214 of the question answering system 200 shown in FIG. 2 can be implemented in any suitable manner. For example, each function 208, 210, 212, 214 can be implemented or supported using one or more software applications or other software instructions that are executed by at least one processor, such as one or more processors 120 of an electronic device 101, 102, 104 or server 106. In other embodiments, at least some of the functions 208, 210, 212, 214 can be implemented or supported using dedicated hardware components. In general, each of the functions 208, 210, 212, 214 here can be implemented using any suitable hardware or any suitable combination of hardware and software/firmware instructions.

Although FIG. 2 illustrates a first example of a DRL-based multi-step question answering system 200, various changes may be made to FIG. 2. For example, the question answering system 200 may receive any additional input data that can be used to generate answers to user questions, such as image data used during visual question answering tasks. Also, the question answering system 200 may support more than three functions 210, 212, 214 in each round of the answer generation process.

Figure 3:
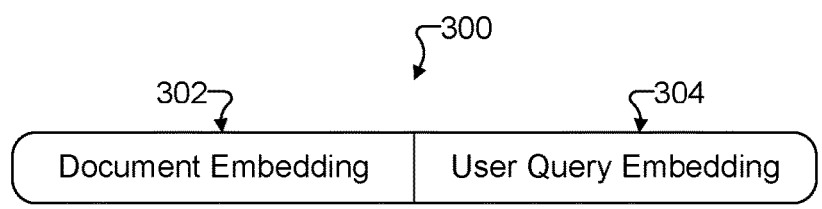
FIG. 3 illustrates a first example input state for a DRL-based multi-step question answering system in accordance with this disclosure.

FIG. 3 illustrates a first example input state 300 for a DRL-based multi-step question answering system 200 in accordance with this disclosure. More specifically, the example input state 300 shown in FIG. 3 may represent the form of a state $s_t$ that is input to the action selection function 208 in the question answering system 200 of FIG. 2. Note, however, that the inputs to the action selection function 208 in the system 200 of FIG. 2 may have any other suitable form.

As shown in FIG. 3, the input state 300 represents a combination of a document embedding 302 and a user query embedding 304. Each embedding 302 and 304 may represent a vector, and the input state 300 may represent a concatenation or other combination of the vectors. The initial document embedding 302 and the initial user query embedding 304 that are provided to the action selection function 208 in a first input state 300 during a first round of the answer generation process may represent the encoded embeddings that are generated by the encoding function 206.

In some cases, the user query embedding 304 may remain constant during the one or more rounds of the answer generation process since the user query 204 typically does not change while an answer 216 is being generated (although it theoretically could if the user sees results from different rounds of the answer generation process). As noted above, however, the sentence selection function 212 and the sub-context selection function 214 can modify the document context $D_i$ during one round of the answer generation process for use as a document context $D_{i+1}$ during the next round of the answer generation process, such as by selecting certain sentences $D_s$ or a sub-context $D_c$. As a result, the document embedding 302 contained in one or more input states 300 provided to the action selection function 208 during one or more subsequent rounds can differ from the initial document embedding 302 contained in the first input state 300 provided to the action selection function 208 during the first round of the answer generation process.

Thus, the document embeddings 302 contained in the input states 300 provided to the action selection function 208 during different rounds may come in different varieties. In some embodiments, the document embedding 302 contained in the input state 300 provided to the action selection function 208 during each round may have one of three forms. In a first form, a document embedding 302 in an input state 300 may represent the full contents of the original document 202. The first form may be used in the input state 300 for at least the first round of the answer generation process, although the function 212 or 214 may be used in the first round or one or more subsequent rounds to change the document embedding 302 used in future input states 300. In a second form (such as after processing by the sentence selection function 212), a document embedding 302 in an input state 300 may contain information for only selected sentences from the original document 202. This can be expressed as $\hat{D}_i = D_s = \cup_{i=i}^{K} s_i$, where $s_i$ represents the $i^{th}$ selected sentence from the current document context $D_i$ and K represents a total number of selected sentences from the current document context $D_i$. In a third form (such as after processing by the sub-context selection function 214), a document embedding 302 in an input state 300 may contain information from the current document context $D_i$ but excluding an incorrect answer $A_i$. This can be expressed as $\hat{D}_i = D_c = D_i \backslash A_i$. The third form can be based on the fact that most correct answers are within the top K possible answers (if the answer with the highest probability turns out to be incorrect).

Essentially, each input state 300 is used to store the current objective information that the system 200 knows and therefore the current information to be processed by the system 200. By defining three possible actions here, the system 200 is provided with more potentials for finding correct answers at the document-level (using the first form)

and at the sentence-level (using the second form) while rejecting incorrect answers (using the third form). This supports a coarse-to-fine approach for identifying answers while also supporting the rejection of false-positive answers.

Although FIG. 3 illustrates a first example of an input state 300 for a DRL-based multi-step question answering system 200, various changes may be made to FIG. 3. For example, other arrangements of document and question embeddings may be used in the system 200. Also, additional information may be used in the input state 300, such as user feedback or other information that might help guide subsequent rounds of the answer generation process.

FIG. 4 illustrates an example encoding layer 400 for a DRL-based multi-step question answering system in accordance with this disclosure. The encoding layer 400 may, for example, represent one possible implementation of the encoding function 206 in the multi-step question answering system 200 of FIG. 2. However, other techniques may be used by the encoding function 206 to generate document and question embeddings for use in the system 200.

As shown in FIG. 4, the encoding layer 400 encodes a document 202 or a user query 204 using a two-layer structure formed by an input embedding layer 402 and an embedding encoder layer 404. In this example, the input embedding layer 402 receives or generates a word-level embedding 406 (which may be denoted $x_w$) and a character-level embedding 408 (which may be denoted $x_c$) for each word in a document 202 or user query 204. The input embedding layer 402 also concatenates or otherwise combines the word-level embedding 406 and the character-level embedding 408 for each word using a combination function 410 to produce a word representation (which may be denoted $x_i$) for each word in the document 202 or user query 204. In some embodiments, each word representation $x_i$ produced by the input embedding layer 402 can be defined as $x_i = x_w \oplus x_c \in \mathbb{R}^{d_1+d_2}$, where $d_1$ represents the dimension of the associated word-level embedding $x_w$, $d_2$ represents the dimension of the associated character-level embedding $x_c$, and $\oplus$ represents the concatenation of two vectors.

The word representations $x_i$ for various words contained in the document 202 or user query 204 form a collection 412 of embeddings, which may be said to represent a word vector x. In some embodiments, the collection 412 represents embeddings formed by the word representations $x_i$ for all words contained in the document 202 or user query 204. In particular embodiments, the word-level embeddings $x_w$, may use pre-trained GloVe embedding vectors (where $d_1$=300), and each character of a word may be represented by a trainable vector (where $d_2$=200). Also, each character-level embedding $x_c$ may be generated by taking the maximum value of each row of the character matrix of a word. The word-level and character-level vectors are combined together in the collection 412 for input to the embedding encoder layer 404.

The embedding encoder layer 404 uses the embeddings in the collection 412 as tokens representing a document 202 or user query 204 and passes the embeddings through various operational layers shown in FIG. 4. Here, the embeddings in the collection 412 are processed using a convolutional neural network layer 414, which generally applies a convolution operation to the embeddings. The convolutional layer 414 applies at least one convolutional matrix (often called a filter or kernel) to the embeddings, where the convolutional layer 414 has a kernel size denoted $k_s$ and a number of filters denoted $d_f$. The outputs of the convolutional layer 414 are combined with the inputs of the convolutional layer 414 via a combination function 416. The results are then passed through a self-attention layer 418, which generally operates to identify how different parts of the document 202 or user query 204 relate to one another. In some embodiments, the self-attention layer 418 can be implemented as disclosed in Vaswani et al., "Attention is all you need," Advances in Neural Information Processing Systems (2017) (which is hereby incorporated by reference in its entirety). The outputs of the self-attention layer 418 are combined with the inputs of the self-attention layer 418 via a combination function 420. The results are then passed through a feedforward layer 422, which generally includes neurons that are configured to receive and process all outputs from the prior layer. The output of the feedforward layer 422 is an encoded embedding of a document 202 or an encoded embedding of a user query 204 (depending whether the input to the encoding function 206 is a document 202 or a user query 204) in a feature space.

Although FIG. 4 illustrates one example of an encoding layer 400 for a DRL-based multi-step question answering system 200, various changes may be made to FIG. 4. For example, each of the input embedding layer 402 and the embedding encoder layer 404 may be implemented in any other suitable manner. Also, in this example, the embedding encoder layer 404 uses a single convolutional layer 414, which can help to boost training speeds. However, the embedding encoder layer 404 may use other numbers of convolutional layers or other neural network/machine learning layers.

FIG. 5 illustrates an example sentence selection layer 500 for a DRL-based multi-step question answering system in accordance with this disclosure. The sentence selection layer 500 may, for example, represent one possible implementation of the sentence selection function 212 in the multi-step question answering system 200 of FIG. 2. However, other techniques may be used by the sentence selection function 212 to select one or more sentences from a current document context $D_i$ for further processing.

As shown in FIG. 5, the sentence selection layer 500 operates to select one or multiple answer-related sentences from a current document context 502. In this example, the user query 204 is processed by an embedding encoder layer 504 to produce a query embedding 506. It should be noted, however, that the embedding encoder layer 504 need not actually form a part of the sentence selection function 212 in other embodiments. Since the user query 204 may have been previously encoded by the encoding function 206, the query embedding 506 may stay the same through all rounds of the answer generation process, and the query embedding 506 may actually represent the user query embedding 304 in the current input state 300. The current document context 502 is processed by an embedding encoder layer 508 to produce sentence embeddings 510 (each of which may be denoted $s_i$). The query embedding 506 is combined with each of the sentence embeddings 510 using a combination function 512, such as by concatenating the query embedding 506 with each of the sentence embeddings 510. This produces combined embeddings, each of which includes the query embedding 506 and one of the sentence embeddings 510.

A convolutional neural network (CNN) layer 514 applies a convolution operation to the combined embeddings. The convolutional neural network layer 514 here is used here to define a probability distribution over the sentences $\{s_1, s_N\}$, where N represents the total number of sentences in the current document context 502. Thus, the sentence embedding 510 for each of the N sentences in the current document context 502 (together with the query embedding 506) can be fed into the convolutional neural network layer 514. The outputs of the convolutional neural network layer 514 represent the probability of each of the N sentences containing an answer to the user query 204. Stated another way, the outputs of the convolutional neural network layer 514 are the probability distributions of all sentences, which can be defined as $p(s=s_i|x, d)$ ($i=\{1, \ldots N\}$). This can be represented mathematically as follows:

$$p(s=s_i|Q,D_i)=f_{CNN}^{SS}(Q,D_i) \quad (1)$$

where $f_{CNN}^{SS}$ represents the convolution function of the convolutional neural network layer 514.

During use, embeddings 506 of tokens in the user query 204 can be concatenated or otherwise combined with embeddings 510 of tokens in each sentence $s_i$, and the combined embeddings are input to the convolutional neural network layer 514. During training, the convolutional neural network layer 514 is trained to select sentences with the top K highest probabilities and to combine those sentences as the next document context for the next step or round of the answer generation process, so $\hat{D}_i = D_s = \cup_{i=i}^{K} s_i$. In some embodiments, K is initially a positive integer value greater than one, and the value of K is reduced by one for each subsequent round through the training process. As a result, one fewer sentence can be selected for each subsequent round. Also, in some embodiments, the convolutional neural network layer 514 is trained together in the system 200 using actor-critic loss functions (which are discussed below).

Although FIG. 5 illustrates one example of a sentence selection layer 500 for a DRL-based multi-step question answering system 200, various changes may be made to FIG. 5. For example, the sentence selection layer 500 may be implemented in any other suitable manner. Also, in this example, the sentence selection layer 500 uses a single convolutional layer 514, but the sentence selection layer 500 may use other numbers of convolutional layers or other neural network/machine learning layers.

FIG. 6 illustrates an example answer generation layer 600 for a DRL-based multi-step question answering system in accordance with this disclosure. The answer generation layer 600 may, for example, represent one possible implementation of the answer generation function 210 in the multi-step question answering system 200 of FIG. 2. However, other techniques may be used by the answer generation function 210 to generate an answer 216 from a current document context $D_i$.

As shown in FIG. 6, the answer generation layer 600 operates to generate an answer 216 to the user query 204 directly based on the current document context $D_i$ (which may include text, images, or other suitable contents). In this example, the answer generation layer 600 receives a document embedding 602 and a query embedding 604. These embeddings 602, 604 could represent the embeddings 302, 304 contained in the current input state 300 for the question answering system 200. The answer generation layer 600 uses the current context $D_i$ of the document 202 represented by the document embedding 602 to identify the answer 216 to the user query 204 represented by the query embedding 604.

In this example, the embeddings 602 and 604 are provided to a context-query attention layer 606, which generates context-query attention information identifying how the words in the document embedding 602 relate to the words in the query embedding 604 (and vice versa). In some embodiments, the context-query attention layer 606 computes a context-to-query attention matrix A and a query-to-context attention matrix B as follows. The context-query attention layer 606 computes a similarity matrix S, which identifies a similarity value for each pair of context and query words. In some cases, a similarity function used to compute the similarity values in the similarity matrix S can be a trilinear function that may be expressed as follows:

$$f(q,d)=W_0[q,d,q \odot d] \quad (2)$$

Here, q represents a word token in the user query 204, and d represents a word token in the current document context $D_i$. Also, $\odot$ represents an element-wise multiplication, and $W_0$ is a trainable variable. The context-query attention layer 606 computes a normalized similarity matrix $\overline{S}$, which may be generated by applying a softmax function or other function to each row of the original similarity matrix S. In some embodiments, the context-to-query attention matrix A can then be computed as $A=\overline{S} \cdot Q^T$, where $Q$ is a vector representing the user query 204. The context-query attention layer 606 also computes a normalized similarity matrix $\overline{\overline{S}}$, which may be generated by applying a softmax function or other function to each column of the original similarity matrix S. In some embodiments, the query-to-context attention matrix B can then be computed as $B=\overline{S} \cdot \overline{\overline{S}}^T \cdot D_i^T$.

The outputs of the context-query attention layer 606 are processed using multiple model encoder layers 608, 610, 612. The input of each model encoder layer 608, 610, 612 can be expressed as [d, a, d⊙a, d⊙b], where a and b are rows of the attention matrices A and B generated by the context-query attention layer 606. Each of the model encoder layers 608, 610, 612 encodes representations of context words based on knowledge of the user query 204, and outputs of the model encoder layers 608, 610, 612 capture interactions between context words in the current document context $D_i$ conditioned on the user query 204. Similar to the embedding encoder layer 404 described above, each of the model encoder layers 608, 610, 612 may contain a convolutional layer, a self-attention layer, and a feedforward layer. The three model encoder layers 608, 610, 612 can share the same weights between each other.

Various output layers 614-628 are then used to process the outputs of the model encoder layers 608, 610, 612. Here, the output layers include concatenation layers 614 and 616, which concatenate the outputs from two different pairs of the model encoder layers 608, 610, 612. The output layers also include linear layers 618 and 620, which apply linear transformations to outputs of the concatenation layers 614 and 616. The output layers further include softmax layers 622 and 624, which apply a softmax function to outputs of the linear layers 618 and 620. The outputs from the softmax layers 622 and 624 represent probabilities for starting and ending positions of the correct answer 216 in the current document context $D_i$. This can be expressed as follows:

$$p_{start}=\text{softmax}(W_1[E_0;E_1]) \quad (3)$$

$$p_{end}=\text{softmax}(W_2[E_0;E_2]) \quad (4)$$

Here, $E_0$, $E_1$, and $E_2$ respectively represent the outputs of the model encoder layers 608, 610, 612, and $W_1$ and $W_2$ are trainable variables. Also, $p_{start}$ and $p_{end}$ are calculated for each word in the current document context $D_i$, and these values identify the probability of each word representing either the start ($p_{start}$) or the end ($p_{end}$) of the correct answer 216 to the user query 204.

A final output 630 from the answer generation layer 600 represents a final answer to the user query 204. The final output 630 is generated by extracting the text from the current document context $D_i$ between and including the words having the highest starting probability (which may be denoted $p_{start}^{max}$) and the highest ending probability (which may be denoted $p_{end}^{max}$). Thus, the word associated with $p_{start}^{max}$ represents the selected word having a maximum starting probability, and the word associated with $p_{end}^{max}$ represents the selected word having a maximum ending probability.

As a particular example of this functionality, assume a user asks "What was the most visited landmark in San Francisco in 2018?" The question answering system 200 may obtain the following information (such as from a website or other document):

A Leave No Trace park, encompassing nearly 16 acres, Mission Dolores Park is one of San Francisco's most popular visited destinations in 2018, the vibrant heart of its equally vibrant, culturally diverse neighborhood. Here you'll find lush green lawns shaded by tall palm trees, a soccer field, six tennis courts, one basketball court, a multi-use court, a playground, and two off-leash dog play areas.

The question answering system 200 may determine that "Mission" (in "Mission Dolores Park") has the highest starting probability $p_{start}^{max}$ and that "Park" (in "Mission Dolores Park") has the highest ending probability $p_{end}^{max}$. Given that, the question answering system 200 would determine that "Mission Dolores Park" is the correct answer to the user's question.

Although FIG. 6 illustrates one example of an answer generation layer 600 for a DRL-based multi-step question answering system 200, various changes may be made to FIG. 6. For example, the answer generation layer 600 may be implemented in any other suitable manner that is capable of generating answers to user queries based on document contexts.

The sub-context selection function 214 of the multi-step question answering system 200 handles cases where an answer $A_i$ generated using the current document context $D_i$ has a higher possibility of representing a false-positive answer and should therefore be eliminated. In some embodiments, the sub-context selection function 214 can be implemented by executing the answer generation function 210 (which may be implemented using the answer generation layer 600) based on the current document context $D_i$ at step i. Then, a new document context $\hat{D}_i$ is created by removing the answer $A_i$ and concatenating sub-contexts before and after $A_i$, which can be expressed as $\hat{D}_i = D_i \backslash A_i$. The new document context $\hat{D}_i$ is fed back to the action selection function 208 as the document context for the next round, meaning $D_{i+1} = \hat{D}_i$.

As described above, one of the functions 210, 212, 214 in the question answering system 200 of FIG. 2 is selected during each step or round through the answer generation process to identify an answer 216 for a user query 204. In the following discussion, the functions 210, 212, 214 may be represented using the following notations. The answer generation function 210 is denoted $a_1$ and generates an answer directly from the current document context $D_i$. For example, the answer generation function 210 can read the embeddings for the current document context $D_i$ of the document 202 and the user query 204 and generate two probabilities for each word of the current document context $D_i$ being the starting/ending points of the correct answer 216. The final answer 216 will be given as the context between the words with the highest starting and ending probabilities. The answer generation function 210 results in a terminal state being reached.

The sentence selection function 212 is denoted $a_2$ and selects one or more sentences with the highest possibilities of containing a correct answer. Assuming K sentences are selected using the sentence selection function 212 in one round of the answer generation process, a new document context $D_{i+1}$ to be used in the next round of the answer generation process can be expressed as $D_{i+1} = \hat{D}_i = [\hat{s}_1; \hat{s}_2; \hat{s}_3; \ldots, \hat{s}_K]$. The sentence selection function 212 results in a non-terminal state being reached.

The sub-context selection function 214 is denoted $a_3$ and removes a potential answer $A_i$ generated from the current context $D_i$ of the document 202 if and when the system 200 determines that the potential answer $A_i$ is a false-positive or incorrect answer. Assuming the incorrect potential answer $A_i$ is identified using the sub-context selection function 214 in one round of the answer generation process, a new document context $D_{i+1}$ to be used in the next round of the answer generation process can exclude the portion(s) of the document containing the potential answer $A_i$, which can be expressed as $D_{i+1} = \hat{D}_i = D_i \backslash A_i$. The sub-context selection function 214 results in a non-terminal state being reached.

During training of the question answering system 200, the system 200 learns to decide which action $a_1$, $a_2$, and $a_3$ is the best action to choose (using the action selection function 208) under various states $s_t$ based on the expected rewards $r_t$ associated with those actions. Thus, the rewards $r_t$ represent another important element in reinforcement-based learning and can greatly affect the performance and robustness of a DRL model. In the system 200, different rewards $r_t$ can be designed for different action-state pairs. For example, in a first action-state pair, when the action $a_1$ is selected, an answer is generated directly from a current document context $D_i$. In this case, a reward $r_1$ can be defined as a score associating a generated answer $A_i$ and its associated ground truth $A^*$ (which represents the actual correct answer). In particular embodiments, the score represents an F1-score between the generated answer $A_i$ and the ground truth $A^*$ and can be expressed as follows:

$$r_1 = F1(A_i, A^*) \quad (5)$$

In a second action-state pair, when the action $a_2$ is selected, one or more answer-related sentences are identified from a current document context $D_i$ to define a new document context. In that case, a reward $r_2$ can be defined based on whether the new document context $\hat{D}_i = D_s = \bigcup_{i=i}^{K} s_i$ contains the ground truth $A^*$. If it does, the reward $r_2$ can be represented by a value of one. If it does not, the reward $r_2$ can be represented by a value of zero. In particular embodiments, this can be expressed as follows:

$$r_2 = \begin{cases} 1 & \text{if } A^* \subseteq D_s = \bigcup_{i=i}^{K} s_i \\ 0 & \text{otherwise} \end{cases} \quad (6)$$

In a third action-state pair, when the action $a_3$ is selected, a potential answer $A_i$ generated from a current document context $D_i$ is removed to define a new document context. In this case, a reward $r_3$ can be defined based on whether the new document context $\hat{D}_i = D_c = D_i \backslash A_i$ contains the ground truth answer $A^*$. If it does, the reward $r_3$ can be represented by a value of one. If it does not, the reward $r_3$ can be represented by a value of zero. In particular embodiments, this can be expressed as follows:

$$r_3 = \begin{cases} 1 & \text{if } A^* \subseteq D_c = D_i \backslash A_i \\ 0 & \text{otherwise} \end{cases} \quad (7)$$

Note that these three rewards $r_1$, $r_2$, and $r_3$ may be used during training and that one reward may be selected at each step of the answer generation process (depending on which action-state pair is selected). Also note that the first reward $r_1$ is typically assigned when an answer is generated directly during the first step or round of the answer generation process. The second and third rewards $r_2$ and $r_3$ are typically assigned after the first round, assuming there are multiple rounds. Thus, only one final reward is assigned to a sample in order to guarantee convergence of the reinforcement learning algorithm.

As a machine learning algorithm, the DRL-based multi-step question answering system 200 can be trained to perform the functions described above. When an actor-critic based reinforcement learning model is used with the question answering system 200, two neural networks can be used to model the actor and critic separately. The actor network takes a state $s_t$ as its input and generates action probabilities based on specified policies, which can be expressed as $\pi_\theta(a_t|s_t)$. In some embodiments, the actor network can use a policy gradient technique to generate the action probabilities. After performing the actor-generated state $a_t$, the system 200 reaches a new state $s_{t+1}$, and the critic network can generate two values (expected rewards) $v_t$ and $v_{t+1}$ by taking $s_t$ and $s_{t+1}$ as inputs. In some embodiments, the critic network can use a value-based approach (such as a deep-Q network or "DQN"). Essentially, the actor network is trained to select among the various actions based on different states to maximize rewards, and the critic network helps the training of the actor network to converge.

In some embodiments, two loss functions may be used for training the actor neural network and the critic neural network separately. In particular implementations, these loss functions can be expressed as follows:

$$\mathcal{L}_{actor} = -\log \pi_\theta(a_t|s_t)(r_t + \gamma v_{t+1} + v_t) \quad (8)$$

$$\mathbb{R}_{critic} = (r_t + \gamma v_{t+1} - v_t)^2 \quad (9)$$

Here, $\gamma$ represents a discount factor in the DRL model. Based on these definitions, the actor network aims to maximize the expected rewards to be obtained, and the critic network aims to minimize the temporal difference error during the stochastic learning process by evaluating the results generated by the actor network. Using this approach, the question answering system 200 can be trained to select appropriate actions $a_1$, $a_2$, and $a_3$ based on new user queries 204. Note, however, that the loss functions shown in Equations (8) and (9) are examples only and that the actor and critic networks can be trained in any other suitable manner.

The DRL-based multi-step question answering system 200 described above can efficiently process documents of different lengths by choosing appropriate functions 210, 212, 214 in each round of the answer generation process. In some embodiments, the system 200 can be designed using an actor-critic based DRL model or other suitable DRL model to achieve multi-step question answering. Compared to previous question answering models, the system 200 can handle both short and long documents, obtain improved accuracy, and have faster trainings speeds.

Figure 7:
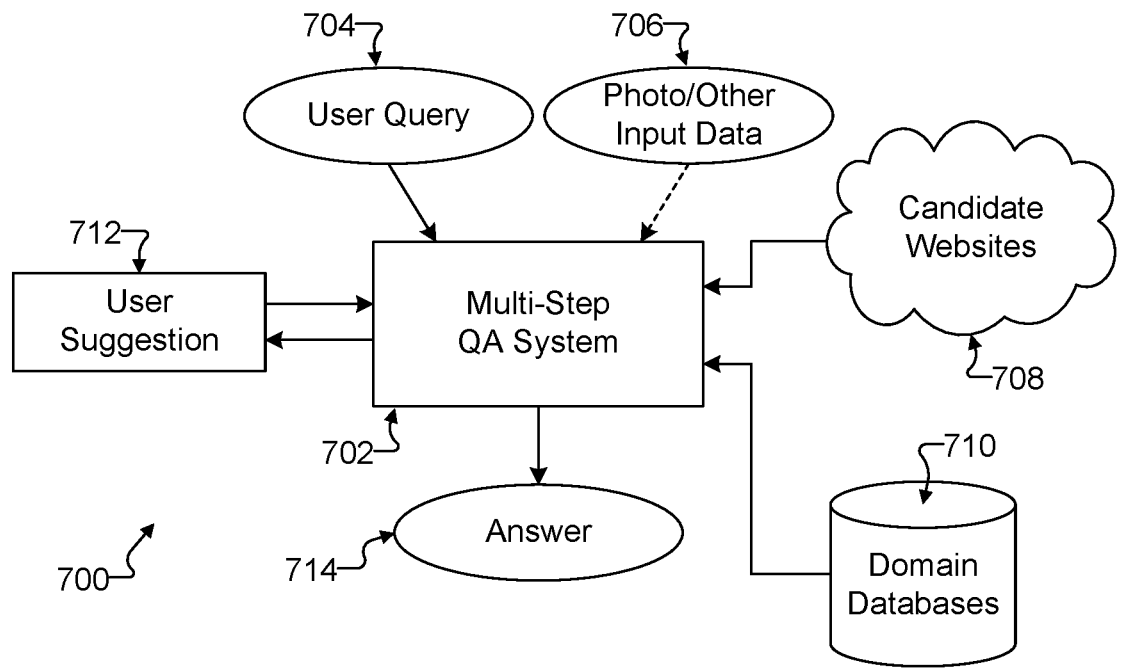
FIG. 7 illustrates an example architecture for using a DRL-based multi-step question answering system in accordance with this disclosure.

FIG. 7 illustrates an example architecture 700 for using a DRL-based multi-step question answering system in accordance with this disclosure. As shown in FIG. 7, the architecture 700 includes a multi-step question answering system 702 that is used to interact with one or more users. In this example, the question answering system 702 receives a user query 704, optionally along with other input data 706, from each of one or more users.

The other input data 706 may represent non-textual or other information that is associated with a user query 704, such as a photo or other image. As a particular example, a user may submit a user query 704 asking "What bridge is this?", and the user query 704 may be accompanied by input data 706 that includes an image of a bridge (which may be captured by the user's electronic device 101, 102, 104 or obtained from any other suitable source). If the input data 706 does include an image captured by the user's electronic device 101, 102, 104, the input data 706 may also include other useful information, such as GPS coordinates or other position information associated with the electronic device 101, 102, 104.

Note that each user query 704 received by the question answering system 702 here may or may not be accompanied by other input data 706. Also note that while a single user query 704 is shown in FIG. 7, the question answering system 702 may be used to answer multiple user queries 704 from any number of users, and some user queries 704 may be stand-alone queries while other user queries 704 may be accompanied by other input data 706.

The question answering system 702 uses information from one or more candidate websites 708 and/or from one or more domain-specific databases 710 to answer each user query 704. Each candidate website 708 generally represents a website identified by the question answering system 702 as possibly containing information that may be used to answer a user query 704. Each domain-specific database 710 generally represents a database dealing with one or more particular domains or types/topics of information, and one or more of the domain-specific databases 710 can be identified based on a user query 704. Access to a domain-specific database 710 is often restricted or otherwise non-public, and access to a domain-specific database 710 is typically purchased by a service provider that is operating the question answering system 702.

The question answering system 702 can generate encoded embeddings of each user query 704 (with the optional input data 706) and information retrieved from one or more candidate websites 708 and/or one or more domain-specific databases 710 based on that user query 704 and process the embeddings to answer the user query 704 during an answer generation process. In this sense, the embeddings may be the same as or similar to the embeddings discussed above with respect to the question answering system 200, where the user query 704 and information retrieved from one or more candidate websites 708 and/or one or more domain-specific databases 710 (which may be said to represent a current document context $D_i$) can be generated and processed.

The specific candidate websites 708 and/or domain-specific databases 710 to be used to answer a particular user query 704 may be identified by the question answering system 702 in any suitable manner. For example, the candidate websites 708 may be identified by the question answering system 702 by performing at least one web-based Internet search using the contents of the user query 704 and possibly any other input data 706. As another example, the domain-specific databases 710 may be identified by the question answering system 702 based on the contents of the user query 704 and possibly any other input data 706 using preexisting knowledge that is available to the question answering system 702. Of course, the candidate websites 708 and/or the domain-specific databases 710 to be used for each user query 704 may be identified in other ways without departing from the scope of this disclosure.

During the answer generation process for each user query 704, the question answering system 702 can interact with a user suggestion mechanism 712, which allows a user associated with the user query 704 to provide feedback or other information that may be used to help guide the answer generation process. For example, as described below, the user may provide an indication of which specific website 708 or which specific type of domain-specific database 710 should be used to answer the user's query 704 through the user suggestion mechanism 712. The question answering system 702 can then use the user's feedback when generating an answer 714 to the user query 704. Since the question answering system 702 represents a multi-step question answering system, the user may be able to provide feedback during one step or during multiple steps of the answer generation process.

In some embodiments, a user's selection provided via the user suggestion mechanism 712 may be used as a hard limit to control where the answer 714 to the user query 704 is obtained. In these embodiments, the answer 714 to the user query 704 is contained in the actual website 708 or the actual domain-specific database 710 identified by the user. In other embodiments, a user's selection provided via the user suggestion mechanism 712 may be used to help guide the answer generation process but does not actually limit where the answer 714 to the user query 704 is obtained. Instead, the question answering system 702 may use information derived from the user feedback to identify or extract possible answers to the user query 704 from one or more websites 708 and/or domain-specific databases 710, even if those websites 708 and/or domain-specific databases 710 are not explicitly selected by the user. Thus, for instance, the question answering system 702 might identify various candidate websites 708 based on the user query 704, receive a selection of one of the candidate websites 708 from the user via the user suggestion mechanism 712, and select information from a domain-specific database 710 to answer the user query 704. Among other things, this may allow a domain-specific database 710 (which may be considered more reliable than a website 708 identified in web-based search results) to be used to answer a user query 704, where specific types of information can be extracted from the domain-specific database 710 based on the user query 704 and the user feedback. This may also allow a website 708 to be identified if a determination is made that no domain-specific databases 710 may have the answer 714 to the user query 704.

The question answering system 702 in FIG. 7 may be implemented in any suitable manner. For example, the question answering system 702 may be executed or otherwise provided by a server 106 operating the network configuration 101. The question answering system 702 may then receive user queries 704 from and provide answers 714 to various electronic devices 101, 102, 104. Each user suggestion mechanism 712 may also be implemented in any suitable manner to obtain information from a user. For instance, each user suggestion mechanism 712 may be implemented using text-based or voice-based interactions with a user, such as when a digital personal assistant or other function of the user's electronic device 101, 102, 104 interacts with the user (like via text or voice interactions).

In some embodiments, the architecture 700 in FIG. 7 may use the DRL-based multi-step question answering system 200 described above as the question answering system 702. Thus, in these embodiments, the question answering system 702 can include a DRL-based action selection function 208, which identifies one of various functions 210, 212, 214 to be performed during each of one or more steps or rounds through an answer generation process. Here, the document context D used by the question answering system 702 can represent contents from the one or more candidate websites 708 and/or from the one or more domain-specific databases 710. The question answering system 702 can therefore generate encoded document and query embeddings and process the embeddings during one or more rounds. In some cases, the answer 714 may be generated in the round by the answer generation function 210 based on the current document context $D_t$. In other cases, one or more of the functions 212, 212 may remove information from the current document context D for further processing during a subsequent round.

In other embodiments, the architecture 700 in FIG. 7 may use a modified embodiment of a DRL-based multi-step question answering system (as compared to the question answering system 200 described above). Additional details regarding one example of a modified multi-step question answering system are provided below. Note that the question answering system described below may share many common features with the question answering system 200 described above and that, for brevity, those details are not reproduced or repeated in the discussion below.

The user feedback provided to the question answering system 702 can be used by the question answering system 702 to learn new behaviors. For example, the question answering system 702 may use the feedback from a single user to learn over time which sources of information the user prefers when queries are being answered. This may allow, for example, the question answering system 702 to automatically select a particular source of information when answering future queries 704 from the same user. This can also be done for groups of users, where feedback from each group of users can be used during subsequent searches for answers in response to queries 704 from that group. Similarly, the question answering system 702 may use the feedback from various users to learn when particular web-based Internet searches for websites 708 or particular searches for domain-specific databases 710 may not be effective. In general, the user feedback can essentially be used to help determine when the rewards $r_t$ associated with the various actions at should be updated, which can then affect which actions at are selected in the future (since the adjusted rewards $r_t$ may change which actions are selected).

Although FIG. 7 illustrates one example of an architecture 700 for using a DRL-based multi-step question answering system 702, various changes may be made to FIG. 7. For example, the use of websites 708 and domain-specific databases 710 are for illustration only. The question answering system 702 may use information obtained from any other or additional source(s) to generate answers 714 for user queries 704.

Figure 8:
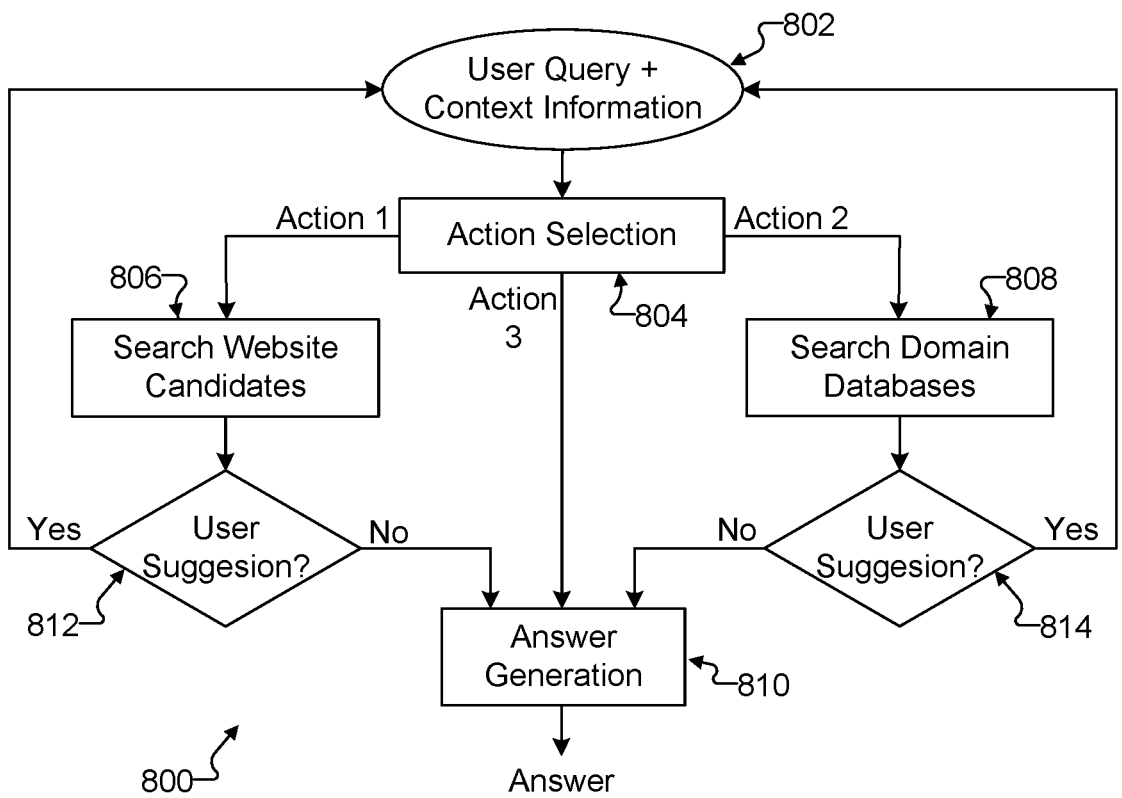
FIG. 8 illustrates a second example DRL-based multi-step question answering system in accordance with this disclosure.

FIG. 8 illustrates a second example DRL-based multi-step question answering system 800 in accordance with this disclosure. For ease of explanation, the multi-step question answering system 800 of FIG. 8 may be described as being executed or otherwise provided by the server 106 in the network configuration 100 of FIG. 1 to answer user queries received from one or more electronic devices 101, 102, 104. However, the multi-step question answering system 800 of FIG. 8 may be executed or otherwise provided by any suitable device(s), including by the electronic devices 101, 102, 104 themselves, and in any suitable system(s).

As shown in FIG. 8, the question answering system 800 has a similar structure as the question answering system 200 described above. In this example, the question answering system 800 receives or generates one or more embeddings 802 associated with a user query and any context information. For example, the embeddings 802 may include various embeddings that are concatenated or otherwise combined to produce input states. The various embeddings include an embedding associated with a user query 704 (and possibly with other input data 706) and an embedding associated with one or more websites 708 and/or one or more domain-specific databases 710. The various embeddings may also include an embedding associated with any user feedback received via the user suggestion mechanism 712. The embeddings 802 may be generated in any suitable manner, such as by using the encoding layer 400 described above or another implementation of the encoding function 206 described above.

Figure 9:
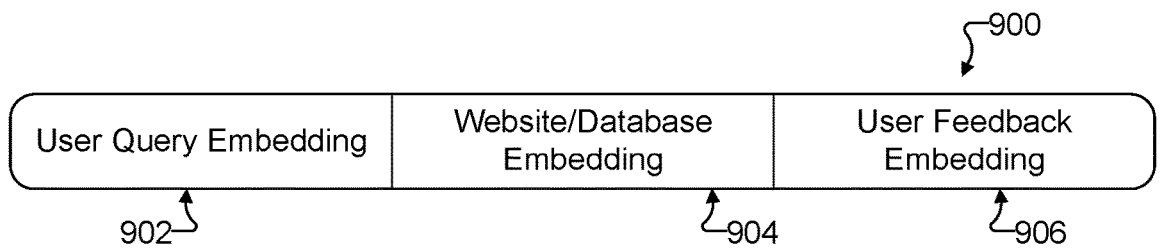
FIG. 9 illustrates a second example input state for a DRL-based multi-step question answering system in accordance with this disclosure.

An action selection function 804 selects one of three functions 806, 808, 810 to perform during each round of the answer generation process that is being used to generate an answer 714 for a user query 704. The selection of the particular function 806, 808, 810 to be performed in any particular round of the answer generation process by the action selection function 804 can be based, at least in part, on the embeddings 802 contained in an input state received by the action selection function 804 for that round. One example format of the input states that may be received by the action selection function 804 is shown in FIG. 9, which is described below.

In this example, the functions 806, 808, 810 are somewhat different compared to the functions 210, 212, 214 described above. In FIG. 8, the action selection function 804 can choose to perform a search candidate websites function 806, a search domain databases function 808, or an answer generation function 810. The answer generation function 810 is used to generate an answer 714 to a user query 704 based on currently-available information, such as information from one or more previously-identified websites 708, domain-specific databases 710, or other information (which may be said to represent the current context $D_i$). In some embodiments, the answer generation function 810 may be implemented in the same or similar manner as shown in FIG. 6.

The approach shown in FIG. 8 also expressly incorporates user input/user feedback as part of or in conjunction with the search functions 806 and 808. For example, when the search candidate websites function 806 is used, the search candidate websites function 806 can generate a list identifying potential candidate websites 708 and provide the list to the user via the user suggestion mechanism 712. The candidate websites 708 may be identified in any suitable manner, such as by performing a web-based Internet search using the user query 704 or based on preexisting knowledge (like knowledge of prior searches conducted for the same user) in conjunction with the user query 704. A determination function 812 (which could also be implemented as part of the search candidate websites function 806) can determine whether the user provides any suggestions for searching a specific website from among the list of candidate websites 708. If not, the system 800 can invoke the answer generation function 810 using currently-available information. If a user suggestion is received via the user suggestion mechanism 712, the question answering system 800 can perform another round of the answer generation process while considering the user feedback. Here, the user feedback may be used to produce an embedding 802 included in the input state provided to the action selection function 804 in the next round.

Similarly, when the search domain databases function 808 is used, the search domain databases function 808 can generate a list identifying domain-specific databases 710 and provide the list to the user via the user suggestion mechanism 712. The domain-specific databases 710 may be identified in any suitable manner, such as based on preexisting knowledge (like knowledge of prior searches conducted for the same user) in conjunction with the user query 704. A determination function 814 (which could also be implemented as part of the search domain databases function 808) can determine whether the user provides any suggestions for searching a specific database from among the list of candidate databases 710. If not, the system 800 can invoke the answer generation function 810 using currently-available information. If a user suggestion is received via the user suggestion mechanism 712, the question answering system 800 can perform another round of the answer generation process while considering the user feedback. Here, the user feedback may again be used to produce an embedding 802 included in the input state provided to the action selection function 804 in the next round.

The user feedback received in relation to the search functions 806 and 808 here may be viewed as narrowing the type or scope of information to be used in subsequent rounds of the answer generation process to identify the answer 714 to the user query 704. In this respect, the search functions 806 and 808 may be viewed as implementing a type of sentence selection function 212 by narrowing the information to be used in subsequent rounds. Note that while not shown here, a function similar to the sub-context selection function 214 may also be used in the question answering system 800 to exclude information from one or more websites 708, domain-specific databases 710, or other source(s) that might give rise to a false-positive answer.

The multi-step question answering system 800 here can still be based on a deep reinforcement learning model, and each potential action (functions 806, 808, and 810) in each round of the answer generation process can be assigned a reward based on candidate information and user input. As with the system 200, the main parameters in a DRL model include states $s_t$, actions $a_t$, and rewards $r_t$. Under this approach, for a given state $s_t$ that is input to the action selection function 804, the system 800 seeks the best action $a_t$ to perform in order to maximize an expected reward $r_t$ that is obtained by following some policy $\pi$. In this particular example, using the same type of notation described above, three actions can be defined as action $a_1$ (choose candidate websites), action $a_2$ (choose database domains), and action $a_3$ (generate answer), which are used in the discussion below.

Each input state $s_t$ that is provided to the action selection function 804 stores the current objective information that the system 800 knows and therefore the current information to be processed by the system 800. The state $s_t$ is used (together with calculated reward information) to allow the system 800 to make a decision on which action $a_1$, $a_2$, or $a_3$ to take in each round of the answer generation process. In some embodiments, the states $s_t$ used in FIG. 8 may each have the form shown in FIG. 9.

FIG. 9 illustrates a second example input state 900 for a DRL-based multi-step question answering system in accordance with this disclosure. More specifically, the example input state 900 shown in FIG. 9 may represent the form of a state $s_t$ that is input to the action selection function 804 in the question answering system 800 of FIG. 8. Note, however, that the inputs to the action selection function 804 in the question answering system 800 of FIG. 8 may have any other suitable form. Also note that this form for the input state 900 is similar to the input state 300 shown in FIG. 3 and described above, but the input state 900 has been expanded to expressly support the use of user input.

As shown in FIG. 9, the input state 900 represents a combination of a user query embedding 902, a website or database embedding 904, and a user feedback embedding 906. Each of these embeddings 902, 904, 906 may be generated in any suitable manner, such as by using the encoding layer 400 described above or another implementation of the encoding function 206 described above. The user query embedding 902 represents the user query 704 and possibly other input data 706 associated with the user query 704, such as an image. The ability to include embedded information about an image or other non-textual input data 706 in a feature space helps to support various functions, such as visual searching by the question answering system 800. As noted above, the user query embedding 902 typically does not change while an answer 714 is being generated (although it theoretically could if the user sees results from different rounds of the answer generation process). The website or database embedding 904 may represent the websites 708, domain-specific databases 710, or other options that have been identified and presented for selection by a user. The user feedback embedding 906 may represent a particular website 708, a specific domain-specific database 710, or other feedback information selected or otherwise provided by the user.

As with the input state 300 described above, the contents of the input state 900 shown in FIG. 9 can vary during different rounds of the answer generation process performed by the question answering system 800. For example, in a first round of the answer generation process, the input state 900 may include a user query embedding 902 for a user query 704 and any associated input data 706. If the search candidate websites function 806 is performed and the user selects a particular candidate website 708 from among a list of candidate websites 708, the input state 900 in the next round may include the user query embedding 902, a website or database embedding 904 identifying the list of candidate websites 708, and a user feedback embedding 906 identifying the selected candidate website 708. If the search domain databases function 808 is performed and the user selects a particular database 710 from among a list of domain-specific databases 710, the input state 900 in the next round may include the user query embedding 902, a website or database embedding 904 identifying the list of domain-specific databases 710, and a user feedback embedding 906 identifying the selected database 710. Since the question answering system 800 is a multi-step system, it is also possible for the website or database embedding 904 to identify multiple sets of options provided to the user and for the user feedback embedding 906 to identify multiple selections by the user.

Returning to FIG. 8, the rewards used in the question answering system 800 may be somewhat similar to various rewards discussed above. For example, with respect to action $a_1$ (choose candidate websites), a reward $r_1$ may be assigned a value of one if the system 800 identifies at least $K_1$ websites 708 containing the answer 714 to the user query 704 (where $K_1$ can be specified by a system designer or other user), or the reward $r_1$ may be assigned a value of zero otherwise. With respect to action $a_2$ (choose database domains), a reward $r_2$ may be assigned a value of one if the system 800 identifies at least $K_2$ top domain-specific databases 710 contain the answer 714 to the user query 704 (where $K_2$ can be specified by a system designer or other user and may or may not equal $K_1$), or the reward $r_2$ may be assigned a value of zero otherwise. With respect to action $a_3$ (generate answer), a reward $r_3$ may be assigned a value of one if both $r_1$ and $r_2$ equal zero.

Using appropriately-defined states, actions, and rewards, the question answering system 800 can be trained in the same or similar manner as the system 200 described above. For example, the model can be trained using the actor-critic based reinforcement learning approach with two deep neural networks (one for the actor model and one for the critic model). The same loss functions shown in Equations (8) and (9) above may be used here to train the question answering system 800, although the actor and critic networks can be trained in any other suitable manner. Also, the use of the actor-critic based reinforcement learning model is not required, and other approaches can be used.

The question answering system 800 here can be used in various ways with different types of user queries and different types of user feedback, and the user feedback may be received in one or multiple rounds of the answer generation process. The following presents several examples of how the question answering system 800 may be used with specific types of user feedback. However, these examples are for illustration only, and the question answering system 800 may be used in any number of other ways without departing from the scope of this disclosure.

In a first example, a user submits a user query 704, provides feedback once, and receives an answer 714 based on a web search that is conducted according to the user feedback. For instance, assume a user asks "What was the most visited landmark in San Francisco in 2018?" The question answering system 800 may decide to perform action $a_1$ and execute the search candidate websites function 806, which performs a search to identify a list of candidate web sites 708. The question answering system 800 may then ask the user something like:

Which of the following candidate links is the one you prefer me to search? Or I can decide by myself if you say "No."
1. Top 20 Attractions San Francisco, Calif.—SF
2. San Francisco Travel Reports Record Breaking Tourism
3. The most popular San Francisco destinations to visit in 2018
4. Uber's Top 10 Travel Destinations 2018—one's an SF spot!
5. I have no preference, I would just like to know the answer!

The hyperlinks identified in options 1-4 here represent the candidate websites 708 and may be based on the web search conducted using the user query 704 (although the candidate websites 708 may be identified in any other suitable manner). The user may then respond with something like "Please use link 4," or the user may physically select the associated hyperlink on the display 160 of the user's electronic device 101, 102, 104. At that point, the question answering system 800 can access suitable information (at the fourth link or other location, such as a domain-specific database 710) and provide an answer 714 to the user based on that information.

In a second example, a user submits a user query 704, provides feedback twice, and receives an answer 714 based on a web search that is conducted according to the user's first feedback and based on a knowledge graph (such as from a database 710) or other information according to the user's second feedback. For instance, assume a user again asks "What was the most visited landmark in San Francisco in 2018?" The question answering system 800 may decide to perform action $a_1$ and execute the search candidate websites function 806, which performs a search to identify a list of candidate websites 708. The question answering system 800 may then ask the user something like:

Which of the following candidate links is the one you prefer me to search? Or I can decide by myself if you say "No."
1. Top 20 Attractions San Francisco, Calif.—SF
2. San Francisco Travel Reports Record Breaking Tourism
3. The most popular San Francisco destinations to visit in 2018
4. Uber's Top 10 Travel Destinations 2018—one's an SF spot!
5. I have no preference, I would just like to know the answer!

The hyperlinks identified in options 1-4 again represent the candidate websites 708 and may be based on the web search conducted using the user query 704 (although the candidate websites 708 may be identified in any other suitable manner). Assume this time the user selects the second hyperlink. At this point, the question answering system 800 can access information (such as at the website 708 associated with the second hyperlink or other location, like a domain-specific database 710) and determine that additional user feedback may be useful. For instance, the website 708 associated with the second hyperlink may indicate that "tourism" can involve a number of different domains, so the answer to the user's question can depend on the desired domain. Thus, for instance, the question answering system 800 may then ask:

Based on your question and preference, can you tell me which one of the following you would like to see?
1. Natural scenery
2. Human-made landscape
3. Airports The options presented here may be based on contents of the website 708 at the second hyperlink, information of one or more domain-specific databases 710, or other information. Depending on the user selection here, the question answering system 800 can access the website at the second hyperlink or use an existing knowledge graph from a domain-specific database 710 or other information to provide an answer 714 to the user based on the user's feedback. For example, if the user selects the third option (airports), the question answering system 800 may respond with "San Francisco Airport was the most visited landmark in San Francisco in 2018."

As can be seen in these two examples, the answers 716 to the same user query 704 can differ based on the feedback provided by the user. The ability to provide various options to a user during a search and to modify the search based on the user feedback helps to provide more effective answers 716 to user queries 704 while providing insight into how the answers 716 are being generated. For instance, merely responding to both user queries above with "San Francisco Airport was the most visited landmark in San Francisco in 2018" may be undesirable if one of the users was more interested in natural or man-made landmarks and not airports. However, for the second user query above, the user specifically identified an interest in receiving an answer related to airports, so that answer is appropriate for the second user query above.

Note that in the above examples, the user in each case is given the option of providing no preference. In that case, the answer generation function 810 can be invoked based on whatever information is available to the question answering system 800, which may or may not include using one or more of the identified websites 708 and/or one or more of the identified domain-specific databases 710. Also note that while not shown above, the user may also be given the option of requesting additional websites 708 and/or domain-specific databases 710, at which point the answer generation system 800 may provide a list of additional websites 708 or domain-specific databases 710 that have been identified by the system 800 (such as based on the user query 704 or other information).

As noted above, the user query 704 may or may not be accompanied by other input data 706. In some embodiments, the techniques disclosed in this patent document can be extended and applied to visual question answering tasks, where user input can take both a user query and an image (such as a photograph captured by the user's electronic device 101, 102, 104 or otherwise obtained by the user). Thus, for instance, a user may submit a query 704 asking "Which bridge is this?" and include a photo of a bridge as input data 706. The question answering system 800 may again use the user query 704 and the other input data 706 (the image) to determine whether to access candidate websites 708, access domain-specific databases 710, or generate an answer 716. Note that the use of visual question answering tasks is not limited to the question answering system 800 of FIG. 8 and may be used with the question answering system 200 of FIG. 2, as well.

Although FIG. 8 illustrates a second example of a DRL-based multi-step question answering system 800 and FIG. 9 illustrates a second example of an input state 900 for a DRL-based multi-step question answering system 800, various changes may be made to FIGS. 8 and 9. For example, the question answering system 800 may receive any additional input data that can be used to generate answers to user queries. Also, the question answering system 800 may support more than three functions 806, 808, 810 in each round of the answer generation process. In addition, other arrangements of embeddings may be used in the input state 900.

It should be noted here that while different DRL-based multi-step question answering systems have been described above, the various features of the different question answering systems described above may be used in any other suitable combinations. Stated another way, a DRL-based multi-step question answering system may include any combination of the features described above, even if that specific combination of features is not illustrated in the figures. As a result, any of the features described with reference to the question answering system 200 may be used in the question answering system 800 (and vice versa).

Figure 10:
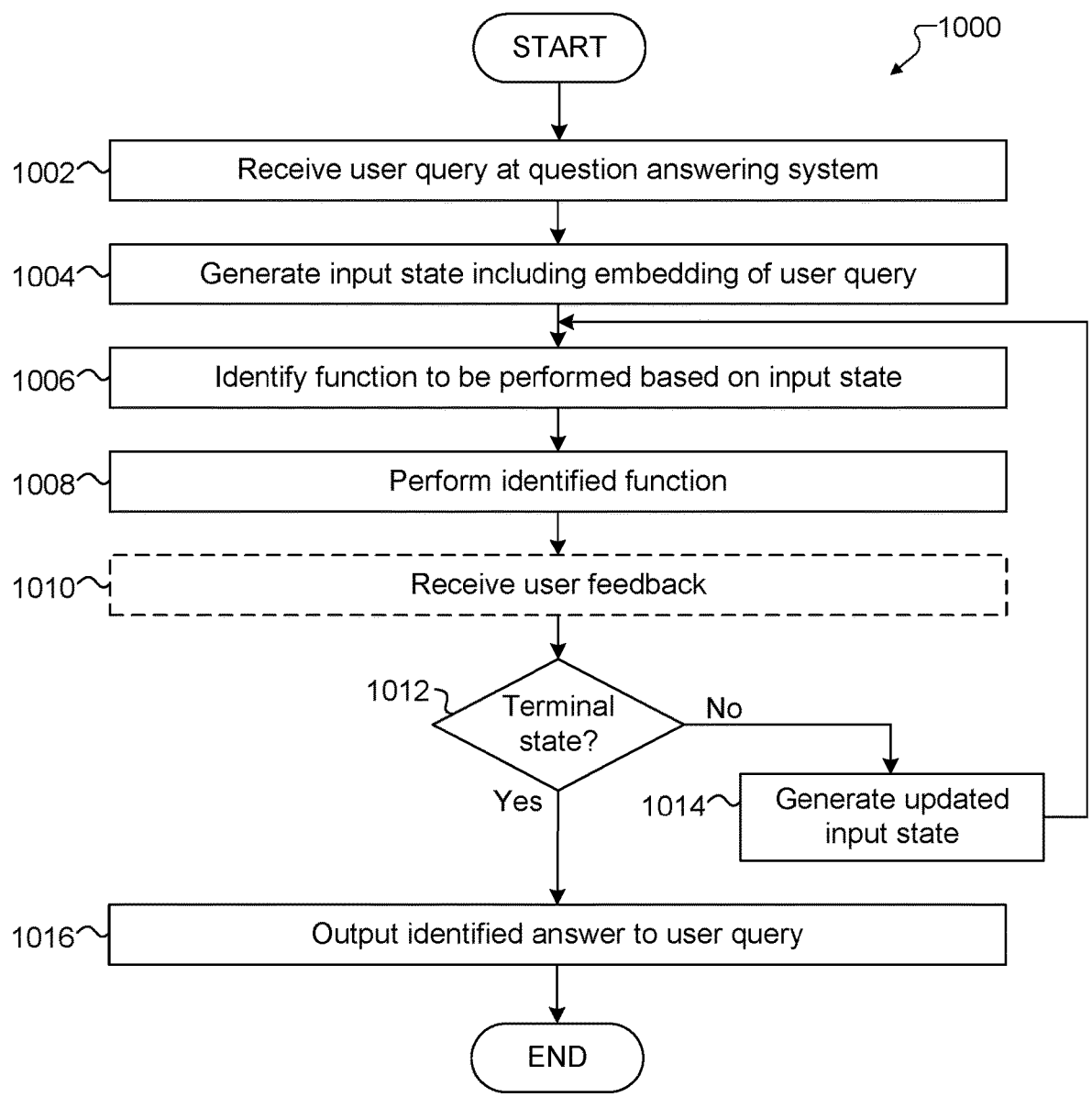
FIG. 10 illustrates an example method for using a DRL-based multi-step question answering system in accordance with this disclosure.

FIG. 10 illustrates an example method 1000 for using a DRL-based multi-step question answering system in accordance with this disclosure. For ease of explanation, the method 1000 is described as involving the use of the question answering system 200 of FIG. 2 or the question answering system 800 of FIG. 8 (possibly within the architecture 700 of FIG. 7), where the question answering system may be executed or otherwise provided by a server 106 that can interact with a user's electronic device 101, 102, 104. However, the method 1000 may involve the use of any suitable question answering system designed in accordance with this disclosure, and the question answering system may be used in any other suitable system(s) and with any other suitable device(s).

As shown in FIG. 10, a user query is received at a question answering system at step 1002. This may include, for example, the question answering system 200, 800 receiving a user query 204, 704, possibly along with additional input data 706. As a particular example, this may include a processor 120 of the server 106 receiving the user query 204, 704 from an electronic device 101, 102, 104. An input state that includes at least an embedding of the user query is generated at step 1004. This may include, for example, the question answering system 200, 800 generating an input state 300, 900 containing at least an embedding 304, 902 of the user query 204, 704 (and any input data 706 if provided). As a particular example, this may include the processor 120 of the server 106 executing the encoding layer 400 or other implementation of the encoding function 206 to generate the embedding of the user query and any other input data. At this point, the input state 300, 900 may or may not include other embeddings.

A function to be performed is identified based on the input state at step 1006. This may include, for example, the question answering system 200, 800 using the action selection function 208, 804 to select one of multiple functions 210-214, 806-810 to be performed based on the input state 300, 900. As a particular example, this may include the processor 120 of the server 106 determining whether to perform one of various defined actions $a_1$, $a_2$, $a_3$ (which may vary depending on the functionality implemented in the question answering system) based on the input state 300, 900 and the expected rewards for the various actions. The action selection function 208, 804 has been trained previously to select the action that maximizes the expected reward, such as via an actor-critic based reinforcement learning model.

The identified function is performed at step 1008. This may include, for example, the question answering system 200, 800 performing a selected one of the functions 210-214, 806-810. As a particular example, this may include the processor 120 of the server 106 generating an answer 216, 714 to the user query 204, 704 based on currently-available information (such as a current context $D_t$), selecting sentences from the current context or excluding an incorrect answer from the current context to generate a new context, or performing a search for websites or for domain-specific databases. Various implementations for selecting sentences, excluding incorrect answers, and performing searches are described above.

Optionally, user feedback may be received at step 1010. This may include, for example, the question answering system 200, 800 receiving user feedback (such as a selection of a specific website 708 or domain-specific database 710) via a user suggestion mechanism 712. As a particular example, this may include the processor 120 of the server 106 receiving a user's selection of a particular option (such as a selection of a specific website 708 or domain-specific database 710 in a list displayed to the user) from the user's electronic device 101, 102, 104.

A determination is made whether a terminal state has been reached at step 1012. This may include, for example, the question answering system 200, 800 determining whether the identified function previously performed involves the generation of an answer 216, 714 to the user query 204, 704 (in which case a terminal state has been reached). This may also include the question answering system 200, 800 determining whether the identified function previously performed involves the altering of the current document context, such as via selection of sentences or exclusion of an incorrect answer from the current document context (in which case a non-terminal state has been reached). This may further include the question answering system 200, 800 determining whether the user provided user feedback (in which case a non-terminal state has been reached).

If a terminal state has not been reached, an updated input state is generated at step 1014. This may include, for example, the question answering system 200, 800 generating an updated input state 300, 900 containing new information, such as a new document embedding 302, a new website or database embedding 904, and/or a new user feedback embedding 906. The process returns to step 1006 to perform another round of the answer generation process. If a terminal state has been reached, the answer generation process has been completed, and an identified answer to the user query is output at step 1016. This may include, for example, the question answering system 200, 800 outputting the identified answer 216, 714 to the user. As a particular example, this may include the processor 120 of the server 106 outputting the identified answer 216, 714 for presentation by the user's electronic device 101, 102, 104 (such as via text or voice delivery).

Although FIG. 10 illustrates one example of a method 1000 for using a DRL-based multi-step question answering system, various changes may be made to FIG. 10. For example, while shown as a series of steps, various steps in FIG. 10 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
    receiving a user query at a multi-step question answering system from a user;
    performing, using at least one processor of the multi-step question answering system, multiple rounds of an answer generation process, wherein each round of the answer generation process comprises:
        selecting one of multiple functions to be performed based on an input state, the input state for each round comprising an embedding of the user query in a feature space, the input state for at least one round further comprising an embedding of information to be used to identify an answer to the user query in the feature space; and
        performing the selected function, wherein the multiple functions include (i) an answer generation function that produces the answer to the user query and (ii) at least one additional function that updates the input state for a current round of the answer generation process for use during a subsequent round of the answer generation process; and
    in response to performing the answer generation function, ending the answer generation process and providing the answer to the user.

2. The method of claim 1, wherein selecting one of the multiple functions in each round of the answer generation process comprises using a deep reinforcement learning-based model to select one of the functions.

3. The method of claim 2, wherein:
    the deep reinforcement learning-based model is trained using actor-critic reinforcement learning to select, in each round of the answer generation process, the function that maximizes an expected reward, different ones of the functions associated with different rewards; and
    the actor-critic reinforcement learning involves an actor neural network and a critic neural network that are trained using different loss functions.

4. The method of claim 1, wherein:
the embedding of the information to be used to identify the answer defines a document context associated with a document containing the answer; and
the at least one additional function comprises:
  a function that selects specific sentences from the document context to produce an updated document context; and
  a function that excludes an incorrect answer from the document context to produce the updated document context.

5. The method of claim 1, wherein the embedding of the information to be used to identify the answer comprises at least one of:
an embedding identifying one or more websites identified based on the user query; and
an embedding identifying one or more domain-specific databases identified based on the user query.

6. The method of claim 1, wherein performing at least one of the rounds of the answer generation process further comprises:
providing an identification of possible sources of information for answering the user query to the user; and
receiving, from the user, feedback indicating whether the user has a preference for using a specific one of the possible sources of information.

7. The method of claim 1, further comprising generating each embedding in the input states by:
obtaining word-level embeddings and character-level embeddings that are combined to produce word vectors; and
processing the word vectors using a convolutional neural network layer, a self-attention layer, and a feedforward layer to produce the embeddings in the input states.

8. The method of claim 1, wherein the answer generation function comprises:
a context-query attention layer configured to generate context-query attention information identifying how words or tokens in a document embedding relate to words or tokens in the embedding of the user query, the document embedding associated with the information to be used to identify the answer;
multiple model encoder layers configured to generate representations of the words or tokens in the document embedding based on knowledge of the user query; and
multiple output layers configured to generate probabilities of each word or token in the document embedding representing starting and ending positions of the answer in the information;
wherein the answer is based on the word or token having a highest starting probability and the word or token having a highest ending probability.

9. An apparatus comprising:
at least one memory; and
at least one processor operatively coupled to the at least one memory and configured to:
receive a user query from a user;
perform multiple rounds of an answer generation process, wherein, to perform each round of the answer generation process, the at least one processor is configured to:
  select one of multiple functions to be performed based on an input state, the input state for each round comprising an embedding of the user query in a feature space, the input state for at least one round further comprising an embedding of information to be used to identify an answer to the user query in the feature space; and
  perform the selected function, wherein the multiple functions include (i) an answer generation function configured to produce the answer to the user query and (ii) at least one additional function configured to update the input state for a current round of the answer generation process for use during a subsequent round of the answer generation process; and
in response to performing the answer generation function, end the answer generation process and provide the answer to the user.

10. The apparatus of claim 9, wherein, to select one of the multiple functions in each round of the answer generation process, the at least one processor is configured to use a deep reinforcement learning-based model to select one of the functions.

11. The apparatus of claim 10, wherein:
the deep reinforcement learning-based model is trained using actor-critic reinforcement learning to select, in each round of the answer generation process, the function that maximizes an expected reward, different ones of the functions associated with different rewards; and
the actor-critic reinforcement learning involves an actor neural network and a critic neural network that are trained using different loss functions.

12. The apparatus of claim 9, wherein:
the embedding of the information to be used to identify the answer defines a document context associated with a document containing the answer; and
the at least one additional function comprises:
  a function configured to select specific sentences from the document context to produce an updated document context; and
  a function configured to exclude an incorrect answer from the document context to produce the updated document context.

13. The apparatus of claim 9, wherein the embedding of the information to be used to identify the answer comprises at least one of:
an embedding identifying one or more websites identified based on the user query; and
an embedding identifying one or more domain-specific databases identified based on the user query.

14. The apparatus of claim 9, wherein, to perform at least one of the rounds of the answer generation process, the at least one processor is configured to:
provide an identification of possible sources of information for answering the user query to the user; and
receive, from the user, feedback indicating whether the user has a preference for using a specific one of the possible sources of information.

15. The apparatus of claim 9, wherein the at least one processor is further configured to:
obtain word-level embeddings and character-level embeddings that are combined to produce word vectors; and
process the word vectors using a convolutional neural network layer, a self-attention layer, and a feedforward layer to produce the embeddings in the input states.

16. The apparatus of claim 9, wherein the answer generation function comprises:
a context-query attention layer configured to generate context-query attention information identifying how words or tokens in a document embedding relate to words or tokens in the embedding of the user query, the document embedding associated with the information to be used to identify the answer;
multiple model encoder layers configured to generate representations of the words or tokens in the document embedding based on knowledge of the user query; and
multiple output layers configured to generate probabilities of each word or token in the document embedding representing starting and ending positions of the answer in the information;
wherein the answer is based on the word or token having a highest starting probability and the word or token having a highest ending probability.

17. A non-transitory machine-readable medium containing instructions that when executed cause at least one processor to:
receive a user query from a user;
perform multiple rounds of an answer generation process, wherein each round of the answer generation process comprises:
selecting one of multiple functions to be performed based on an input state, the input state for each round comprising an embedding of the user query in a feature space, the input state for at least one round further comprising an embedding of information to be used to identify an answer to the user query in the feature space; and
performing the selected function, wherein the multiple functions include (i) an answer generation function configured to produce the answer to the user query and (ii) at least one additional function configured to update the input state for a current round of the answer generation process for use during a subsequent round of the answer generation process; and
in response to performing the answer generation function, end the answer generation process and provide the answer to the user.

18. The non-transitory machine-readable medium of claim 17, wherein the instructions that when executed cause the at least one processor to select one of the multiple functions in each round of the answer generation process comprise:
instructions that when executed cause the at least one processor to select one of the multiple functions using a deep reinforcement learning-based model.

19. The non-transitory machine-readable medium of claim 18, wherein:
the deep reinforcement learning-based model is trained using actor-critic reinforcement learning to select, in each round of the answer generation process, the function that maximizes an expected reward, different ones of the functions associated with different rewards; and
the actor-critic reinforcement learning involves an actor neural network and a critic neural network that are trained using different loss functions.

20. The non-transitory machine-readable medium of claim 17, wherein:
the embedding of the information to be used to identify the answer defines a document context associated with a document containing the answer; and
the at least one additional function comprises:
a function configured to select specific sentences from the document context to produce an updated document context; and
a function configured to exclude an incorrect answer from the document context to produce the updated document context.

21. The non-transitory machine-readable medium of claim 17, wherein the embedding of the information to be used to identify the answer comprises at least one of:
an embedding identifying one or more websites identified based on the user query; and
an embedding identifying one or more domain-specific databases identified based on the user query.

22. The non-transitory machine-readable medium of claim 17, wherein the instructions that when executed cause the at least one processor to perform at least one of the rounds of the answer generation process comprise:
instructions that when executed cause the at least one processor to:
provide an identification of possible sources of information for answering the user query to the user; and
receive, from the user, feedback indicating whether the user has a preference for using a specific one of the possible sources of information.

23. The non-transitory machine-readable medium of claim 17, further containing instructions that when executed cause the at least one processor to:
obtain word-level embeddings and character-level embeddings that are combined to produce word vectors; and
process the word vectors using a convolutional neural network layer, a self-attention layer, and a feedforward layer to produce the embeddings in the input states.

24. The non-transitory machine-readable medium of claim 17, wherein the answer generation function comprises:
a context-query attention layer configured to generate context-query attention information identifying how words or tokens in a document embedding relate to words or tokens in the embedding of the user query, the document embedding associated with the information to be used to identify the answer;
multiple model encoder layers configured to generate representations of the words or tokens in the document embedding based on knowledge of the user query; and
multiple output layers configured to generate probabilities of each word or token in the document embedding representing starting and ending positions of the answer in the information;
wherein the answer is based on the word or token having a highest starting probability and the word or token having a highest ending probability.

25. A method comprising:
training an action selection function of a multi-step question answering system to select one of multiple actions to be performed by the question answering system in each of multiple rounds of an answer generation process used to identify an answer to a user query based on an input state, the input state for each round comprising an embedding of the user query in a feature space, the input state for at least one round further comprising an embedding of information to be used to identify the answer to the user query in the feature space;
wherein the multiple functions include (i) an answer generation function that produces the answer to the user query and (ii) at least one additional function that updates the input state for a current round of the answer generation process for use during a subsequent round of the answer generation process; and
wherein the answer generation process ends upon a selection and performance of the answer generation function.

26. The method of claim 25, wherein the action selection function uses a deep reinforcement learning-based model to select one of the functions.

27. The method of claim 26, wherein:
the deep reinforcement learning-based model is trained using actor-critic reinforcement learning to select, in each round of the answer generation process, the function that maximizes an expected reward; and
different ones of the functions are associated with different rewards.

28. The method of claim 27, wherein the actor-critic reinforcement learning involves an actor neural network and a critic neural network that are trained using different loss functions.

* * * * *